United States Patent
Wang et al.

(10) Patent No.: US 10,200,771 B2
(45) Date of Patent: Feb. 5, 2019

(54) SERVICE SWITCHING SYSTEM AND SERVICE SWITCHING METHOD

(71) Applicant: Huawei Technologies Co., Ltd., Shenzhen (CN)

(72) Inventors: Buyun Wang, Shenzhen (CN); Xinhua Xiao, Shenzhen (CN); Tianhai Chang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/668,481

(22) Filed: Aug. 3, 2017

(65) Prior Publication Data

US 2017/0359638 A1 Dec. 14, 2017

Related U.S. Application Data

(63) Continuation of application No. PCT/CN2015/091875, filed on Oct. 13, 2015.

(30) Foreign Application Priority Data

Feb. 3, 2015 (CN) .......................... 2015 1 0057069

(51) Int. Cl.
*H04Q 11/00* (2006.01)
*H04L 12/24* (2006.01)
(Continued)

(52) U.S. Cl.
CPC ..... *H04Q 11/0067* (2013.01); *H04L 41/0896* (2013.01); *H04L 41/50* (2013.01);
(Continued)

(58) Field of Classification Search
CPC ........... H04Q 11/0067; H04Q 11/0071; H04Q 2011/0084; H04Q 2011/0088; H04L 47/805; H04L 41/50; H04L 41/0896
(Continued)

(56) References Cited

U.S. PATENT DOCUMENTS

| 6,078,596 A | 6/2000 | Wellbrock |
| 7,486,850 B2 | 2/2009 | Ishii et al. |

(Continued)

FOREIGN PATENT DOCUMENTS

| CN | 1691550 A | 11/2005 |
| CN | 1887024 A | 12/2006 |

(Continued)

OTHER PUBLICATIONS

Machine Translation and Abstract of Chinese Publication No. CN1691550, Nov. 2, 2005, 28 pages.

(Continued)

*Primary Examiner* — Juan A Torres
(74) *Attorney, Agent, or Firm* — Conley Rose, P.C.

(57) ABSTRACT

A service switching system and a service switching method, where the system includes at least two service processing subracks and at least one optical cross-connect subrack. Each service processing subrack is connected to each optical cross-connect subrack using an optical fiber. Each service processing subrack is configured to perform service switching for an externally inputted service data electrical signal, and then convert it into an optical signal, and send to one or more optical cross-connect subracks, or vice versa. Each optical cross-connect subrack is configured to receive a service data optical signal from one or more service processing subracks and perform optical cross-connection for the service data optical signal, and then output the service data optical signal to the one or more service processing subracks, which reduce interconnection costs of the service switching system.

18 Claims, 11 Drawing Sheets

(51) Int. Cl.
*H04L 12/927* (2013.01)
*H04L 12/933* (2013.01)

(52) U.S. Cl.
CPC ............ *H04L 47/805* (2013.01); *H04L 49/15* (2013.01); *H04Q 11/0005* (2013.01); *H04Q 11/0071* (2013.01); *H04Q 2011/005* (2013.01); *H04Q 2011/0039* (2013.01); *H04Q 2011/0084* (2013.01); *H04Q 2011/0088* (2013.01)

(58) Field of Classification Search
USPC .......................................................... 398/66
See application file for complete search history.

(56) References Cited

U.S. PATENT DOCUMENTS

| | | |
|---|---|---|
| 2006/0222361 A1 | 10/2006 | Aoki |
| 2007/0076725 A1 | 4/2007 | Papadimitriou |
| 2007/0121507 A1 | 5/2007 | Manzalini et al. |
| 2007/0258444 A1* | 11/2007 | He ..................... H04J 3/1617 370/389 |
| 2010/0172645 A1* | 7/2010 | Liu ..................... H04L 47/782 398/25 |
| 2014/0140697 A1* | 5/2014 | Cao .................... H04Q 11/0005 398/50 |

FOREIGN PATENT DOCUMENTS

| | | |
|---|---|---|
| CN | 101170485 A | 4/2008 |
| CN | 102137313 A | 7/2011 |
| CN | 102143086 A | 8/2011 |
| EP | 1202599 A2 | 5/2002 |
| WO | 2011146066 A1 | 11/2011 |

OTHER PUBLICATIONS

Machine Translation and Abstract of Chinese Publication No. CN101170485, Apr. 30, 2008, 40 pages.
Machine Translation and Abstract of Chinese Publication No. CN102143086, Aug. 3, 2011, 33 pages.
Foreign Communication From a Counterpart Application, PCT Application No. PCT/CN2015/091875, English Translation of International Search Report dated Jan. 21, 2016, 2 pages.
Foreign Communication From a Counterpart Application, PCT Application No. PCT/CN2015/091875, English Translation of Written Opinion dated Jan. 21, 2016, 5 pages.
Machine Translation and Abstract of Chinese Publication No. CN102137313, Jul. 27, 2011, 32 pages.
Foreign Communication From a Counterpart Application, Chinese Application No. 201510057069.2, Chinese Search Report dated Jan. 24, 2018, 2 pages.
Foreign Communication From a Counterpart Application, Chinese Application No. 201510057069.2, Chinese Office Action dated Feb. 2, 2018, 4 pages.
Foreign Communication of a Counterpart Application, European Application No. 15880943.4, Extended European Search Report dated Jan. 18, 2018, 8 pages.

* cited by examiner

SERVICE SWITCHING SYSTEM AND SERVICE SWITCHING METHOD

CROSS-REFERENCE TO RELATED APPLICATIONS

This application is a continuation of International Patent Application No. PCT/CN2015/091875 filed on Oct. 13, 2015, which claims priority to Chinese Patent Application No. 201510057069.2 filed on Feb. 3, 2015. The disclosures of the aforementioned applications are hereby incorporated by reference in their entireties.

TECHNICAL FIELD

The present disclosure relates to service switching technologies in communications networks, and in particular, to a service switching system and a service switching method.

BACKGROUND

At present, with development of communications networks and rapid increase of service bandwidths in service bearer networks, a service switching system based on an electrical clustering technology emerges. The system includes multiple large-capacity service processing subracks that are interconnected and controlled using unified software. The system is manifested as a single device, that is, a network node.

Further, a physical architecture of the service switching system based on an electrical clustering technology is shown in FIG. 1, including multiple service processing subracks 101 (designated as service processing subrack 1, service processing subrack 2, . . . , service processing subrack m) and multiple electrical switching subracks 102 (designated as electrical switching subrack 1, electrical switching subrack 2, . . . , electrical switching subrack n). The service processing subracks 101 are connected to the electrical switching subracks 102 using optical fibers, and service interworking between the service processing subracks 101 is performed via the electrical switching subracks 102. Any inter-subrack service requires two service processing operations and one electrical switching operation.

An inter-subrack connection structure of the service switching system in FIG. 1 is shown in FIG. 2. An electrical signal output by a first service processing subrack 201 is converted into an optical signal using a first electrical-to-optical conversion module (E/O) 202, and the optical signal is transmitted to a first optical-to-electrical conversion module (O/E) 203 using an optical fiber. The first O/E 203 converts the optical signal into an electrical signal, and outputs the electrical signal to an electrical switching subrack 204. After performing electrical switching, the electrical switching subrack 204 outputs the electrical signal to a second E/O 205. The second E/O 205 converts the electrical signal into an optical signal, and transmits the optical signal to a second O/E 206 using an optical fiber. The second O/E 206 converts the optical signal into an electrical signal, and outputs the electrical signal to a second service processing subrack 207. In this way, service switching is completed.

Because service processing subracks are connected using an electrical switching subrack, one electrical switching subrack and four optical modules are required for each service switching, with the costs of two optical-to-electrical conversions, two electrical-to-optical conversions, and one electrical switching. Therefore, to ensure non-blocking switching, total interconnection bandwidth of the optical modules for inter-subrack connection needs to be twice total amount of system service access bandwidth, and total capacity of switching network chips in the electrical switching subrack also needs to be the same as the total system service access bandwidth.

It can be learnt that, such a clustering-based service switching system makes energy consumption, weight, and a volume of the system distributed, and reduces deployment difficulty. However, the large-scale electrical clustering technology-based inter-subrack connection brings relatively high extra costs and additional power consumption. Therefore, it becomes quite necessary to better reduce interconnection costs of the clustering-based service switching system.

In addition, in the electrical clustering technology-based service switching system, when service processing subracks need to provide a larger inter-subrack connection bandwidth, rates of the optical modules between the service processing subracks and the electrical switching subrack need to be increased. In this case, a larger-capacity service processing chip and a higher-rate interface module need to be selected for the service processing subracks. Moreover, the electrical switching subrack needs to be upgraded accordingly, to adapt to the change of the service processing subracks. That is, larger-capacity switching network chips and a higher-rate interface module also need to be selected for the electrical switching subrack. This brings a concurrent upgrade of the service processing subracks and the electrical switching subrack, and results in relatively high costs of system upgrading.

SUMMARY

Embodiments of the present disclosure provide a service switching system and a service switching method in order to reduce interconnection costs of the service switching system.

To achieve the foregoing objective, the following technical solutions are used in the embodiments of the present disclosure.

According to a first aspect, an embodiment of the present disclosure provides a service switching system, including at least two service processing subracks and at least one optical cross-connect subrack, where each service processing subrack is connected to each optical cross-connect subrack using an optical fiber, each service processing subrack is configured to perform service switching for an externally inputted service data electrical signal, convert the service-switched service data electrical signal into an optical signal, and send the optical signal to one or more optical cross-connect subracks, and/or receive a service data optical signal from one or more optical cross-connect subracks, convert the optical signal into an electrical signal, perform service switching, and output the service-switched service data electrical signal to the outside, and each optical cross-connect subrack is configured to receive a service data optical signal from one or more service processing subracks, perform optical cross-connection for the received optical signal, and output the cross-connected optical signal to the one or more service processing subracks.

With reference to the first aspect, in a first possible implementation, the service switching system further includes a bandwidth control unit, where each service processing subrack is connected to the bandwidth control unit, and the bandwidth control unit is configured to perform bandwidth control for the service processing subracks when the service processing subracks perform service switching for different services.

With reference to the first aspect or the first possible implementation of the first aspect, in a second possible implementation, the service processing subrack includes at least one service processing unit, at least one electrical switching unit, and at least one interface adaptation unit, where the service processing unit is configured to perform service processing for an externally inputted service data electrical signal input from the outside, and send the service-processed service data electrical signal to the electrical switching unit, and/or receive and process a service-switched service data electrical signal sent by the electrical switching unit, and output the processed service data electrical signal. The electrical switching unit is configured to receive the service data electrical signal sent by the service processing unit, perform service switching according to switching control information sent by the bandwidth control unit, and send the service-switched service data electrical signal to the interface adaptation unit, and/or receive a service data electrical signal from the interface adaptation unit, perform service switching according to switching control information sent by the bandwidth control unit, and send the service-switched service data electrical signal to the service processing unit. The interface adaptation unit is configured to receive the service data electrical signal sent by the electrical switching unit, convert service data from the electrical signal into an optical signal according to adaptation control information sent by the bandwidth control unit, and send the optical signal to the optical cross-connect subrack, and/or receive a service data optical signal sent by an optical cross-connect subrack, convert the service data from the optical signal into an electrical signal according to adaptation control information sent by the bandwidth control unit, and send the electrical signal to the electrical switching unit.

With reference to the first aspect or the second possible implementation of the first aspect, in a third possible implementation, the optical cross-connect subrack includes at least one optical cross-connect unit, where the optical cross-connect unit is configured to receive a service data optical signal from one or more service processing subracks, perform optical cross-connection for the received optical signal, and output the cross-connected optical signal to the one or more service processing subracks.

With reference to the second possible implementation of the first aspect, in a fourth possible implementation, the electrical switching unit includes a first electrical signal interface, an electrical switching module, a second electrical signal interface, and a first bandwidth control interface, where the electrical switching module is configured to receive the service data electrical signal sent by the service processing unit using the first electrical signal interface, perform service switching according to the switching control information sent by the bandwidth control unit and received from the first bandwidth control interface, and send the service-switched service data electrical signal to the interface adaptation unit using the second electrical signal interface, and/or receive the service data electrical signal that is sent by the interface adaptation unit using the second signal interface, perform service switching according to the switching control information sent by the bandwidth control unit and received from the first bandwidth control interface, and send the service-switched service data electrical signal to the service processing unit using the first electrical signal interface.

With reference to the third possible implementation of the first aspect, in a fifth possible implementation, the interface adaptation unit includes a third electrical signal interface, an adaptation processing module, an optical-electrical conversion interface, and a second bandwidth control interface, where the adaptation processing module is configured to receive the service data electrical signal from the electrical switching unit using the third electrical signal interface, perform adaptation processing according to the adaptation control information sent by the bandwidth control unit and received from the second bandwidth control interface, and send the adaptation-processed service data electrical signal to the optical-electrical conversion interface, and/or receive a service data electrical signal sent by the optical-electrical conversion interface, perform adaptation processing according to the adaptation control information sent by the bandwidth control unit and received from the second bandwidth control interface, and send the adaptation-processed service data electrical signal to the electrical switching unit using the third electrical signal interface, and the optical-electrical conversion interface is configured to convert the service data electrical signal received from the adaptation processing module into an optical signal, and send the optical signal to the optical cross-connect unit in the optical cross-connect subrack, and/or convert the service data optical signal received from the optical cross-connect unit into an electrical signal, and send the electrical signal to the adaptation processing module.

With reference to the third or the fifth possible implementation of the first aspect, in a sixth possible implementation, the adaptation control information sent by the bandwidth control unit includes delay information and sending control information, and the adaptation processing module is further configured to perform receiving processing on the service data electrical signal received from the third electrical signal interface, to recover the service data, obtain first link status information from the recovered service data, perform sorting and alignment processing on the recovered service data, and cache the recovered service data, and send the cached service data to the optical-electrical conversion interface according to the sending control information sent by the bandwidth control unit and second link status information, and perform receiving processing on the service data electrical signal received from the optical-electrical conversion interface, to recover the service data, obtain second link status information from the recovered service data, cache the recovered service data, read the cached service data according to the delay information sent by the bandwidth control unit, and send the read service data to the third electrical signal interface according to first link status information.

With reference to the first aspect or the third possible implementation of the first aspect, in a seventh possible implementation, the optical cross-connect unit includes four optical fiber interfaces, a dynamic optical cross-connector, and a third bandwidth control interface, where the dynamic optical cross-connector is configured to receive, using any optical fiber interface, the service data optical signal from one or more service processing subracks, perform optical cross-connection according to optical cross-connect control information sent by the bandwidth control unit and received using the third bandwidth control interface, and output the cross-connected optical signal to the one or more service processing subracks using any optical fiber interface.

With reference to the first aspect, or the third or the seventh possible implementation of the first aspect, in an eighth possible implementation, the service processing unit sends obtained traffic information to the bandwidth control unit during dynamic service processing, and during dynamic service processing, the bandwidth control unit is configured to obtain service configuration information and receive the traffic information, determine, according to the service configuration information and the traffic information, an optical connection bandwidth required between each interface adaptation unit and each optical cross-connect unit, generate switching control information, adaptation control information, and optical cross-connect control information according to the determined optical connection bandwidth required between each interface adaptation unit and each optical cross-connect unit, and send the switching control information, the adaptation control information, and the optical cross-connect control information to the electrical switching unit, the interface adaptation unit, and the optical cross-connect unit, respectively, and/or during static service processing, the bandwidth control unit is configured to obtain service configuration information, determine, according to the service configuration information, an optical connection bandwidth required between each interface adaptation unit and each optical cross-connect unit, generate switching control information, adaptation control information, and optical cross-connect control information according to the determined optical connection bandwidth required between each interface adaptation unit and each optical cross-connect unit, and send the switching control information, the adaptation control information, and the optical cross-connect control information to the electrical switching unit, the interface adaptation unit, and the optical cross-connect unit, respectively.

With reference to the first aspect, or the third, the seventh, or the eighth possible implementation of the first aspect, in a ninth possible implementation, the bandwidth control unit includes a first traffic information receiving interface, a first configuration interface, a first service bandwidth controller, and a fourth bandwidth control interface, where the first service bandwidth controller is configured to obtain the service configuration information using the first configuration interface and receive the traffic information using the first traffic information receiving interface, determine, according to the service configuration information and the traffic information, the optical connection bandwidth required between each interface adaptation unit and each optical cross-connect unit, generate the switching control information, the adaptation control information, and the optical cross-connect control information according to the determined optical connection bandwidth required between each interface adaptation unit and each optical cross-connect unit, and send, using the fourth bandwidth control interface, the switching control information, the adaptation control information, and the optical cross-connect control information to the electrical switching unit, the interface adaptation unit, and the optical cross-connect unit, respectively during dynamic service processing, and/or obtain the service configuration information using the first configuration interface, determine, according to the service configuration information, the optical connection bandwidth required between each interface adaptation unit and each optical cross-connect unit, generate the switching control information, the adaptation control information, and the optical cross-connect control information according to the determined optical connection bandwidth required between each interface adaptation unit and each optical cross-connect unit, and send, using the fourth bandwidth control interface, the switching control information, the adaptation control information, and the optical cross-connect control information to the electrical switching unit, the interface adaptation unit, and the optical cross-connect unit, respectively during static service processing.

With reference to the first aspect, or the third or the fifth possible implementation of the first aspect, in a tenth possible implementation, the optical cross-connect unit includes four optical fiber interfaces and a static optical cross-connector, where the static optical cross-connector is configured to receive, using any optical fiber interface, the service data optical signal from one or more service processing subracks, perform optical cross-connection according to a fixed connection relationship between an optical input port and an optical output port of the static optical cross-connector, and output the cross-connected optical signal to the one or more service processing subracks using any optical fiber interface, and the optical-electrical conversion interface is configured to receive optical signal wavelength adjustment information from the bandwidth control unit using the second bandwidth control interface, determine a wavelength for sending optical signal according to the optical signal wavelength adjustment information, and convert the service data electrical signal received from the adaptation processing module into an optical signal according to the determined optical signal wavelength, and send the optical signal to the static cross-connector in the optical cross-connect unit, or convert the service data optical signal received from the static optical cross-connector in the optical cross-connect unit into an electrical signal, and send the electrical signal to the adaptation processing module.

With reference to the first aspect or the tenth possible implementation of the first aspect, in an eleventh possible implementation, the service processing unit sends obtained traffic information to the bandwidth control unit during dynamic service processing, and during dynamic service processing, the bandwidth control unit is configured to obtain service configuration information and receive the traffic information, determine, according to the service configuration information and the traffic information, an optical connection bandwidth required between each interface adaptation unit and each optical cross-connect unit, generate switching control information, adaptation control information, and optical signal wavelength adjustment information according to the determined optical connection bandwidth required between each interface adaptation unit and each optical cross-connect unit, send the switching control information to the electrical switching unit, and send the adaptation control information and the optical signal wavelength adjustment information to the interface adaptation unit, and/or during static service processing, the bandwidth control unit is configured to obtain service configuration information, determine, according to the service configuration information, an optical connection bandwidth required between each interface adaptation unit and each optical cross-connect unit, generate switching control information, adaptation control information, and optical signal wavelength adjustment information according to the determined optical connection bandwidth required between each interface adaptation unit and each optical cross-connect unit, send the switching control information to the electrical switching unit, and send the adaptation control information and the optical signal wavelength adjustment information to the interface adaptation unit.

With reference to the first aspect or the eleventh possible implementation of the first aspect, in a twelfth possible implementation, the bandwidth control unit includes a second traffic information receiving interface, a second configuration interface, a second service bandwidth controller, and a fifth bandwidth control interface, where the second service bandwidth controller is configured to obtain the service configuration information using the second configuration interface and receive the traffic information using the second traffic information receiving interface, determine, according to the service configuration information and the traffic information, the optical connection bandwidth required between each interface adaptation unit and each optical cross-connect unit, generate switching control information, adaptation control information, and optical signal wavelength adjustment information according to the determined optical connection bandwidth required between each interface adaptation unit and each optical cross-connect unit, and using the fifth bandwidth control interface, send the switching control information to the electrical switching unit, and send the adaptation control information and the optical signal wavelength adjustment information to the interface adaptation unit, during dynamic service processing, and/or obtain the service configuration information using the second configuration interface, determine, according to the service configuration information, the optical connection bandwidth required between each interface adaptation unit and each optical cross-connect unit, generate the switching control information, the adaptation control information, and the optical signal wavelength adjustment information according to the determined optical connection bandwidth required between each interface adaptation unit and each optical cross-connect unit, and using the fifth bandwidth control interface, send the switching control information to the electrical switching unit, and send the adaptation control information and the optical signal wavelength adjustment information to the interface adaptation unit, during static service processing.

With reference to the first aspect, the eighth possible implementation of the first aspect, or the eleventh possible implementation of the first aspect, in a thirteenth possible implementation, the service processing unit includes a service interface, a service processing module, a fourth electrical signal interface, and a traffic collection interface, where the service processing module is configured to receive the service data electrical signal inputted externally using the service interface, perform service processing, and send the processed service data electrical signal to the electrical switching unit using the fourth signal interface, or receive, using the fourth signal interface, the service data electrical signal sent by the electrical switching unit, perform service processing, and send the processed service data electrical signal to the outside using the service interface, and collect traffic information of service data, and send the traffic information to the bandwidth control unit using the traffic collection interface during a dynamic service processing process.

With reference to the first aspect, or the first, the eighth, the ninth, the eleventh, or the twelfth possible implementation of the first aspect, in a fourteenth possible implementation, the bandwidth control unit is a device independent of the service processing subrack or the optical cross-connect subrack, or is integrated into the service processing subrack or the optical cross-connect subrack.

With reference to the first aspect or the second possible implementation of the first aspect, in a fifteenth possible implementation, two or three of the service processing unit, the electrical switching unit, and the interface adaptation unit are integrated into one board.

According to a second aspect, an embodiment of the present disclosure provides a service switching method, which is applied to the service switching system and includes performing, by a service processing subrack, service switching for an externally inputted service data electrical signal, converting the service-switched service data electrical signal into an optical signal, and sending the optical signal to one or more optical cross-connect subracks, receiving, by an optical cross-connect subrack, a service data optical signal from one or more service processing subracks, performing optical cross-connection for the received optical signal, and outputting the cross-connected optical signal to one or more service processing subracks, and receiving, by the service processing subrack, a service data optical signal from one or more optical cross-connect subracks, converting the optical signal into an electrical signal, performing service switching, and outputting the service-switched service data electrical signal.

With reference to the second aspect, in a first possible implementation, the service switching system further includes a bandwidth control unit, where each service processing subrack is connected to the bandwidth control unit, and the bandwidth control unit performs bandwidth control for the service processing subracks when the service processing subracks perform service switching for different services.

With reference to the second aspect or the first possible implementation of the second aspect, in a second possible implementation, the service processing subrack includes at least one service processing unit, at least one electrical switching unit, and at least one interface adaptation unit, where the step of performing, by a service processing subrack, service switching for an externally inputted service data electrical signal, converting the service-switched service data electrical signal into an optical signal, and sending the optical signal to one or more optical cross-connect subracks includes receiving, by the service processing unit, the service data electrical signal input from the outside, performing service processing, and sending the service-processed service data electrical signal to the electrical switching unit, receiving, by the electrical switching unit, the service data electrical signal sent by the service processing unit, performing service switching according to switching control information sent by the bandwidth control unit, and sending the service-switched service data electrical signal to the interface adaptation unit, and receiving, by the interface adaptation unit, the service data electrical signal sent by the electrical switching unit, converting service data from the electrical signal into an optical signal according to adaptation control information sent by the bandwidth control unit, and sending the optical signal to the optical cross-connect subrack, and the step of receiving, by the service processing subrack, a service data optical signal from one or more optical cross-connect subracks, converting the optical signal into an electrical signal, performing service switching, and outputting the service-switched service data electrical signal includes receiving, by the interface adaptation unit, the service data optical signal sent by the optical cross-connect subrack, converting service data from the optical signal into an electrical signal according to the adaptation control information sent by the bandwidth control unit, and sending the electrical signal to the electrical switching unit, receiving, by the electrical switching unit, the service data electrical signal from the interface adaptation unit, performing service switching according to the switching control information sent by the bandwidth control unit, and sending the service-switched service data electrical signal to the service processing unit, and receiving and processing, by the service processing unit, the service-switched service data electrical signal sent by the electrical switching unit, and outputting the processed service data electrical signal.

With reference to the second aspect or the second possible implementation of the second aspect, in a third possible implementation, the optical cross-connect subrack includes at least one optical cross-connect unit, where the step of receiving, by an optical cross-connect subrack, a service data optical signal from one or more service processing subracks, performing optical cross-connection for the received optical signal, and outputting the cross-connected optical signal to one or more service processing subracks includes receiving, by the optical cross-connect unit, the service data optical signal from one or more service processing subracks, performing optical cross-connect for the received optical signal, and outputting the cross-connected optical signal to one or more service processing subracks.

With reference to the second aspect or the third possible implementation of the second aspect, in a fourth possible implementation, the step of receiving, by the interface adaptation unit, the service data electrical signal sent by the electrical switching unit, converting service data from the electrical signal into an optical signal according to adaptation control information sent by the bandwidth control unit, and sending the optical signal to the optical cross-connect subrack includes receiving, by the interface adaptation unit, the service data electrical signal sent by the electrical switching unit, performing receiving processing to recover the service data, obtaining first link status information from the recovered service data, performing sorting and alignment processing on the recovered service data, and caching the recovered service data, and converting the cached service data into a service data optical signal and sending, according to sending control information sent by the bandwidth control unit and second link status information, the optical signal to the optical cross-connect unit in the optical cross-connect subrack, and the step of receiving, by the interface adaptation unit, the service data optical signal sent by the optical cross-connect subrack, converting service data from the optical signal into an electrical signal according to the adaptation control information sent by the bandwidth control unit, and sending the electrical signal to the electrical switching unit includes receiving, by the interface adaptation unit, the service data optical signal sent by the optical cross-connect unit in the optical cross-connect subrack, converting the optical signal into an electrical signal, performing receiving processing to recover the service data, obtaining second link status information from the recovered service data, caching the recovered service data, reading the cached service data according to delay information sent by the bandwidth control unit, and sending the read service data to the electrical switching unit according to the first link status information.

With reference to the second aspect or the third possible implementation of the second aspect, in a fifth possible implementation, the service processing unit sends obtained traffic information to the bandwidth control unit during dynamic service processing, and when the optical cross-connect unit includes a dynamic optical cross-connector, during dynamic service processing, the bandwidth control unit determines, according to service configuration information and the traffic information, an optical connection bandwidth required between each interface adaptation unit and each optical cross-connect unit, generates switching control information, adaptation control information, and optical cross-connect control information according to the determined optical connection bandwidth required between each interface adaptation unit and each optical cross-connect unit, and sends the switching control information, the adaptation control information, and the optical cross-connect control information to the electrical switching unit, the interface adaptation unit, and the dynamic optical cross-connector in the optical cross-connect unit, respectively, and/or during static service processing, the bandwidth control unit obtains service configuration information, determines, according to the service configuration, an optical connection bandwidth required between each interface adaptation unit and each optical cross-connect unit, generates switching control information, adaptation control information, and optical cross-connect control information according to the determined optical connection bandwidth required between each interface adaptation unit and each optical cross-connect unit, and sends the switching control information, the adaptation control information, and the optical cross-connect control information to the electrical switching unit, the interface adaptation unit, and the optical cross-connect unit, respectively.

With reference to the second aspect or the third possible implementation of the second aspect, in a sixth possible implementation, the service processing unit sends obtained traffic information to the bandwidth control unit during dynamic service processing, and when the optical cross-connect unit includes a static optical cross-connector, during dynamic service processing, the bandwidth control unit determines, according to service configuration information and the traffic information, an optical connection bandwidth required between each interface adaptation unit and each optical cross-connect unit, generates switching control information, adaptation control information, and optical signal wavelength adjustment information according to the determined optical connection bandwidth required between each interface adaptation unit and each optical cross-connect unit, sends the switching control information to the electrical switching unit, and sends the adaptation control information and the optical signal wavelength adjustment information to the interface adaptation unit, and/or during static service processing, the bandwidth control unit obtains service configuration information, determines, according to the service configuration information, an optical connection bandwidth required between each interface adaptation unit and each optical cross-connect unit, generates switching control information, adaptation control information, and optical signal wavelength adjustment information according to the determined optical connection bandwidth required between each interface adaptation unit and each optical cross-connect unit, sends the switching control information to the electrical switching unit, and sends the adaptation control information and the optical signal wavelength adjustment information to the interface adaptation unit.

With reference to the second aspect or the sixth possible implementation of the second aspect, in a seventh possible implementation, the interface adaptation unit receives the optical signal wavelength adjustment information sent by the bandwidth control unit, determines a wavelength for sending optical signal according to the optical signal wavelength adjustment information, converts the service data electrical signal received from the electrical switching unit into an optical signal according to the determined optical signal wavelength, and sends the optical signal to the static cross-connector in the optical cross-connect unit.

With reference to the second aspect, or the fifth or the sixth possible implementation of the second aspect, in an eighth possible implementation, the service configuration information includes optical connection bandwidth allocation policy information, static service connection information, and static service bandwidth information, and the step of generating, by the bandwidth control unit, the switching control information and the adaptation control information according to the service configuration information and the traffic information includes performing bandwidth allocation for a static service according to the optical connection bandwidth allocation policy information, the static service connection information, and the static service bandwidth information, performing bandwidth allocation for a dynamic service according to the optical connection bandwidth allocation policy information and dynamic service connection information obtained from the traffic information, calculating optical connection bandwidths required between interface adaptation units, determining the optical connection bandwidth required between each interface adaptation unit and each optical cross-connect unit, and generating the switching control information and the adaptation control information according to the determined optical connection bandwidth required between each interface adaptation unit and each optical cross-connect unit.

With reference to the second aspect, or the fifth or the sixth possible implementation of the second aspect, in a ninth possible implementation, the method further includes pre-configuring an additional bandwidth between each service processing subrack and each optical cross-connect subrack, and before the optical cross-connect unit performs connection adjustment, sending, by the bandwidth control unit, adaptation control information to an interface adaptation unit on a to-be-adjusted link to switch service data on the to-be-adjusted link to a redundant link brought by the additional bandwidth, and after the optical cross-connect unit completes connection adjustment, sending adaptation control information to the interface adaptation unit on the adjusted link again to switch service data on the redundant link back to the adjusted link, or sending adaptation control information to an interface adaptation unit on a to-be-adjusted link to stop service data sending of the interface adaptation unit on the to-be-adjusted link and cache, in the interface adaptation unit, service data that is sent by the electrical switching unit to the interface adaptation unit before the optical cross-connect unit performs connection adjustment, and sending adaptation control information to the interface adaptation unit on the adjusted link again to resume service data sending of the interface adaptation unit and discharge the cached service data using a redundant link brought by the additional bandwidth after the optical cross-connect unit completes connection adjustment.

It can be learnt from the foregoing technical solutions that, in the service switching system and the service switching method that are provided in the embodiments of the present disclosure, an optical cross-connect subrack is used, instead of an electrical switching subrack used in other approaches to implement interconnection between different service processing subracks. In this way, two electrical-to-optical conversions and two optical-to-electrical conversions during an inter-subrack connection process in other approaches are reduced to one electrical-to-optical conversion and one optical-to-electrical conversion. Therefore, a quantity of optical modules for inter-subrack connection is reduced, and system costs and system power consumption are reduced, that is, interconnection costs of the service switching system are reduced.

In addition, an optical cross-connect subrack can operate independent of a rate of an optical signal between service processing subracks. Therefore, when interconnection rates between the service processing subracks are increased, an existing optical cross-connect subrack can still be used, with no concurrent upgrade caused. Hence, an upgrade process is simplified and upgrade costs of the system are reduced.

Moreover, unlike other approaches which demand the costs of two optical-to-electrical conversions, two electrical-to-optical conversions, and one electrical switching, for each service switching, the service switching system provided in the embodiments of the present disclosure requires only one optical-to-electrical conversion and one electrical-to-optical conversion because an optical cross-connect subrack is used for interconnection between service processing subracks. Therefore, there will be no service blocking in the entire system provided that a total bandwidth supportable by the system is greater than or equal to a required total access bandwidth.

Further, in some embodiments, an additional bandwidth may be configured for the service switching system. In this case, bandwidth allocation and concurrent control for optical cross-connect and electrical switching can be used to further ensure non-blocking switching of system services. This ensures that existing services suffer no impairment during optical cross-connect adjustment.

Certainly, an implementation of any product or method of the present disclosure does not necessarily incorporate all advantages described above.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

The embodiments of the present disclosure provide a service switching system and a service switching method. In the service switching system, an optical cross-connection technology is used in substitute for an electrical switching technology used in the other approaches in order to reduce interconnection costs of the service switching system.

The following embodiments of the service switching system provided in the embodiments of the present disclosure.

Embodiment 1

Figure 1:
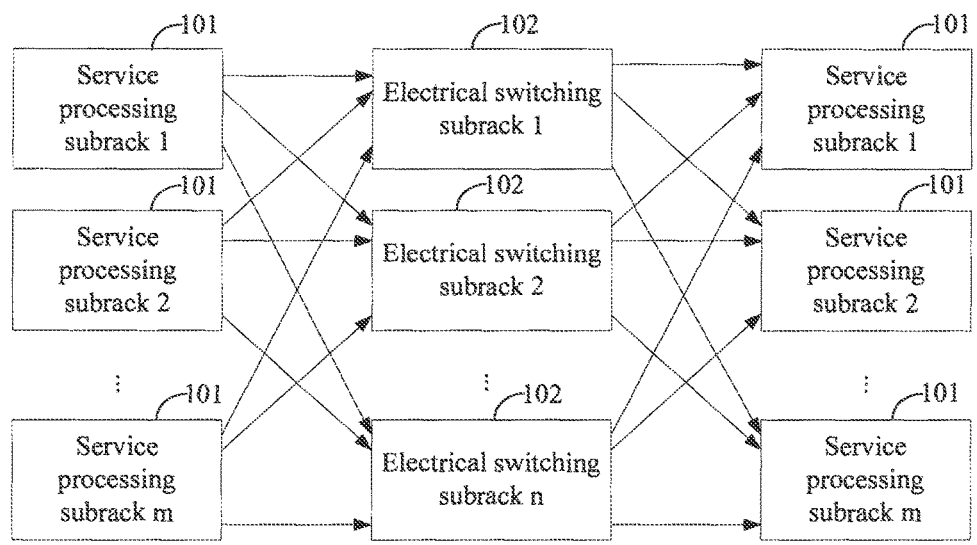
FIG. 1 is a schematic diagram of a physical architecture of a service switching system based on an electrical cluster technology.
Figure 2:
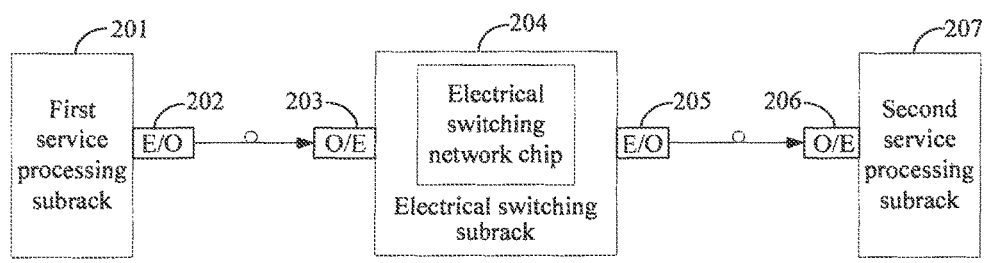
FIG. 2 is a schematic diagram of an inter-subrack connection structure in the service switching system shown in FIG. 1.
Figure 3A:
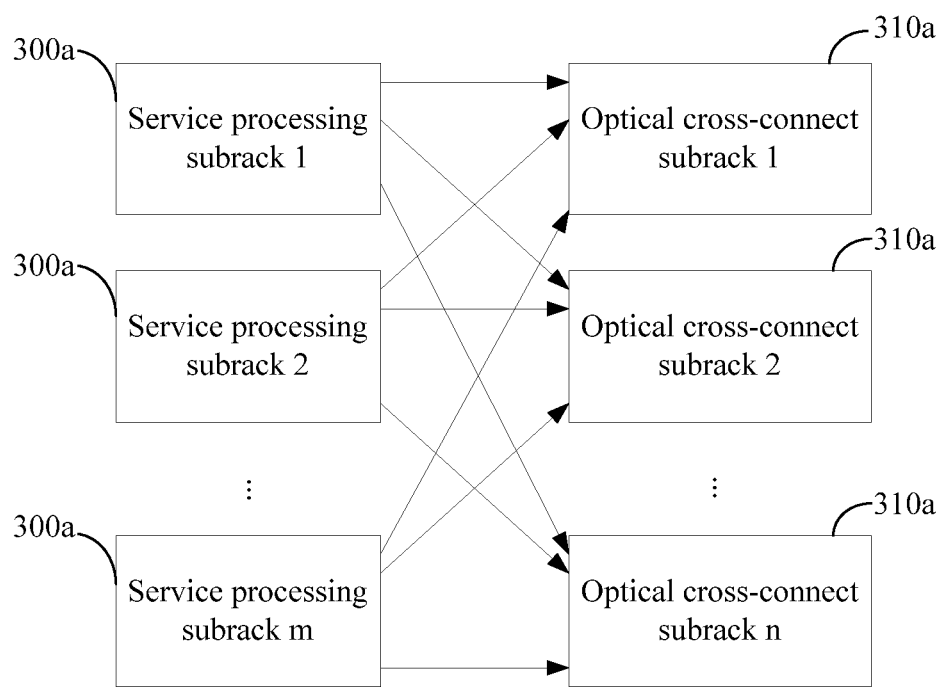
FIG. 3A is a first schematic structural diagram of Embodiment 1 of a service switching system according to an embodiment of the present disclosure.

As shown in FIG. 3A, a service switching system in the Embodiment 1 of the present disclosure includes multiple service processing subracks 300a (designated as service processing subrack 1, service processing subrack 2, . . . , service processing subrack m) and multiple optical cross-connect subracks 310a (designated as optical cross-connect subrack 1, optical cross-connect subrack 2, . . . , optical cross-connect subrack n).

Each service processing subrack 300a is connected to each optical cross-connect subrack 310a using an optical fiber.

Each service processing subrack 300a is configured to perform service switching for a service data electrical signal input from the outside, convert the service-switched service data electrical signal into an optical signal, and send the optical signal to one or more optical cross-connect subracks 310a, and/or receive a service data optical signal from one or more optical cross-connect subracks 310a, convert the optical signal into an electrical signal, perform service switching, and output the service-switched service data electrical signal to the outside.

Each optical cross-connect subrack 310a is configured to receive a service data optical signal from one or more service processing subracks 300a, perform optical cross-connection for the received optical signal, and output the cross-connected optical signal to the one or more service processing subracks 300a.

It should be noted that the service switching system shown in FIG. 3A is applicable only to service switching for only a single static service. The service switching system performs service switching according to preset configuration information and bandwidth control information. Therefore, to enable the service switching system to implement service switching for multiple static services and dynamic services and implement bandwidth adjustment, a bandwidth control unit may be added to the system.

Figure 3B:
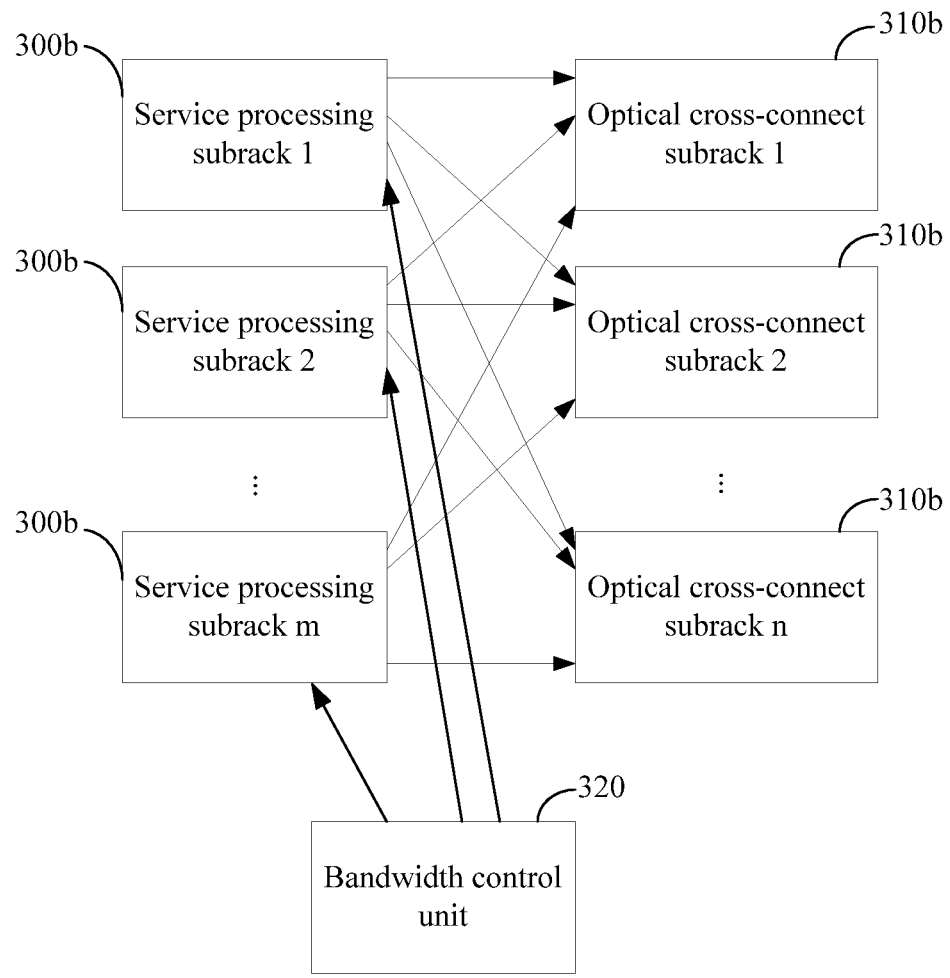
FIG. 3B is a second schematic structural diagram of Embodiment 1 of a service switching system according to an embodiment of the present disclosure.

A service switching system with a bandwidth control unit added is shown in FIG. 3B. Another service switching system in the Embodiment 1 of the present disclosure includes multiple service processing subracks 300b (designated as service processing subrack 1, service processing subrack 2, . . . , service processing subrack m), multiple optical cross-connect subracks 310b (designated as optical cross-connect subrack 1, optical cross-connect subrack 2, . . . , optical cross-connect subrack n), and a bandwidth control unit 320.

Each service processing subrack 300b is connected to each optical cross-connect subrack 310b using an optical fiber, and each service processing subrack 300b is connected to the bandwidth control unit 320.

Each service processing subrack 300b is configured to perform service switching, under control of the bandwidth control unit 320, for a service data electrical signal input from the outside, convert the service-switched service data electrical signal into an optical signal, and send the optical signal to one or more optical cross-connect subracks 310b, and/or receive a service data optical signal from one or more optical cross-connect subracks 310b, convert the optical signal into an electrical signal, perform service switching, and output the service-switched service data electrical signal to the outside.

The optical cross-connect subrack 310b is configured to receive a service data optical signal from one or more service processing subracks 300b, perform optical cross-connection for the received optical signal, and output the cross-connected optical signal to the one or more service processing subracks 300b.

The bandwidth control unit 320 is configured to perform bandwidth control for the service processing subracks 300b when the service processing subracks 300b implement service switching for different services.

It should be noted that, similar to the other approaches, both the service processing subrack 300a and the service processing subrack 300b in this embodiment of the present disclosure are capable of multiple-service processing, service switching, and optical-electrical conversion, and each optical cross-connect subrack 310a and each optical cross-connect subrack 310b are capable of performing optical cross-connection for multiple services. Therefore, to implement interconnection between service processing subracks, in actual application, there should be at least two service processing subracks and at least one optical cross-connect subrack.

Embodiment 2

Figure 4:
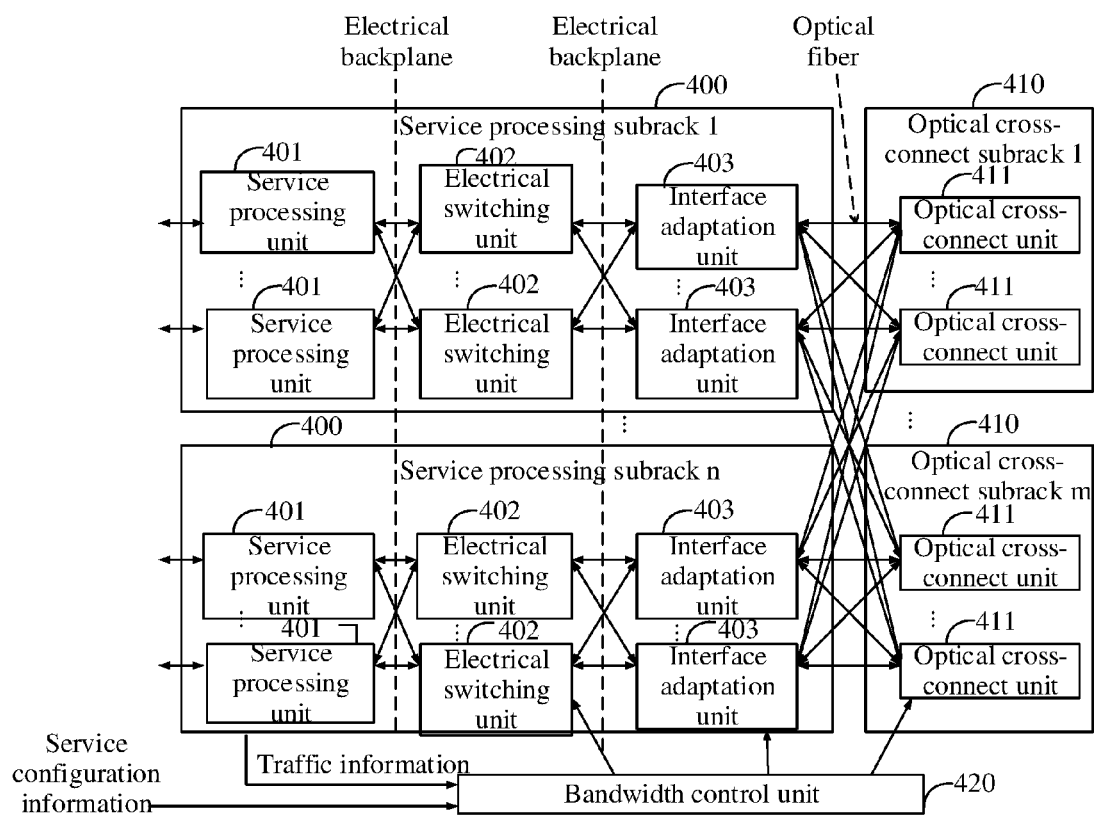
FIG. 4 is a schematic structural diagram of Embodiment 2 of a service switching system according to an embodiment of the present disclosure.

As shown in FIG. 4, a service switching system in the Embodiment 2 of the present disclosure includes multiple service processing subracks 400, multiple optical cross-connect subracks 410, and a bandwidth control unit 420.

Each service processing subrack 400 includes multiple service processing units 401, multiple electrical switching units 402, and multiple interface adaptation units 403. Each optical cross-connect subrack 410 includes multiple optical cross-connect units 411.

In each service processing subrack 400, each service processing unit 401 is connected to each electrical switching unit 402 using an electrical backplane, each electrical switching unit 402 is connected to each interface adaptation unit 403 using an electrical backplane (in FIG. 4, for simplification of drawing, only a scenario in which two electrical switching units 402 are connected to two service processing units 401 and two interface adaptation units 403 is illustrated), each interface adaptation unit 403 is connected to all optical cross-connect units 411 in all optical cross-connect subracks 410 using optical fibers.

The bandwidth control unit 420 is connected to all electrical switching units 402 and all interface adaptation units 403 in all service processing subracks 400.

The service processing unit 401 shown in FIG. 4 is configured to perform service processing for a service data electrical signal input from the outside, and send the service-processed service data electrical signal to the electrical switching unit 402, and/or receive and process a service-switched service data electrical signal sent by the electrical switching unit 402, and output the processed service data electrical signal to the outside.

The electrical switching unit 402 shown in FIG. 4 is configured to receive the service data electrical signal sent by the service processing unit 401, perform service switching according to switching control information sent by the bandwidth control unit 420, and send the service-switched service data electrical signal to the interface adaptation unit 403, and/or receive a service data electrical signal from the interface adaptation unit 403, perform service switching according to switching control information sent by the bandwidth control unit 420, and send the service-switched service data electrical signal to the service processing unit 401.

Figure 5:
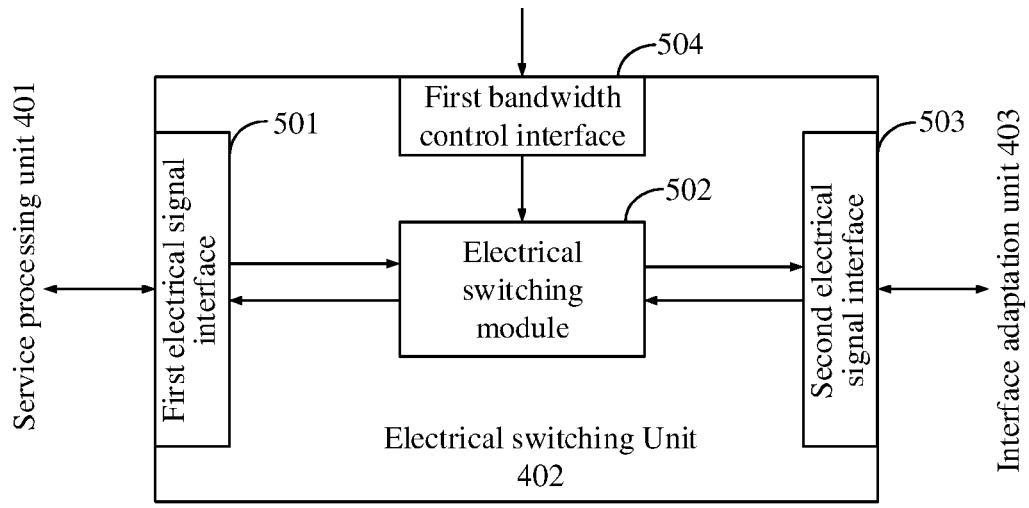
FIG. 5 is a schematic structural diagram of an electrical switching unit in the service switching system shown in FIG. 4.

Further, a structure of the electrical switching unit 402 in this embodiment may be shown in FIG. 5. The electrical switching unit 402 includes a first electrical signal interface 501, an electrical switching module 502, a second electrical signal interface 503, and a first bandwidth control interface 504.

The electrical switching module 502 is configured to receive the service data electrical signal sent by the service processing unit 401 using the first electrical signal interface 501, perform service switching according to the switching control information that is sent by the bandwidth control unit 420 and received from the first bandwidth control interface 504, and send the service-switched service data electrical signal to the interface adaptation unit 403 using the second electrical signal interface 503, and/or receive the service data electrical signal that is sent by the interface adaptation unit 403 using the second signal interface 503, perform service switching according to the switching control information that is sent by the bandwidth control unit 420 and received from the first bandwidth control interface 504, and send the service-switched service data electrical signal to the service processing unit 401 using the first electrical signal interface 501. In actual application, the switching control information may include a source port number and a destination port number. The electrical switching module 502 performs service switching directly according to the source port number and the destination port number. In this embodiment, the electrical switching module 502 may be implemented by a switching network chip that is commonly seen in the market.

The interface adaptation unit 403 shown in FIG. 4 is configured to receive the service data electrical signal sent by the electrical switching unit 402, convert service data from the electrical signal into an optical signal according to adaptation control information sent by the bandwidth control unit 420, and send the optical signal to the optical cross-connect subrack 410, and/or receive the service data optical signal sent by the optical cross-connect subrack 410, convert service data from the optical signal into an electrical signal according to adaptation control information sent by the bandwidth control unit 420, and send the electrical signal to the electrical switching unit 402.

It should be noted that in this embodiment, when sending a service data electrical signal to an electrical switching unit 402, a service processing unit 401 may select any one or more electrical switching units 402 to perform the sending. In addition, when sending a service data electrical signal to an interface adaptation unit 403, an electrical switching unit 402 may select any one or more interface adaptation units 403 to perform the sending. Correspondingly, a process in which a service processing subrack receives service data from an optical cross-connect subrack and processes the service data is similar. A specific selection and sending method and a specific selection and sending process are the same as those in the other approaches. Details are not described herein.

Figure 6:
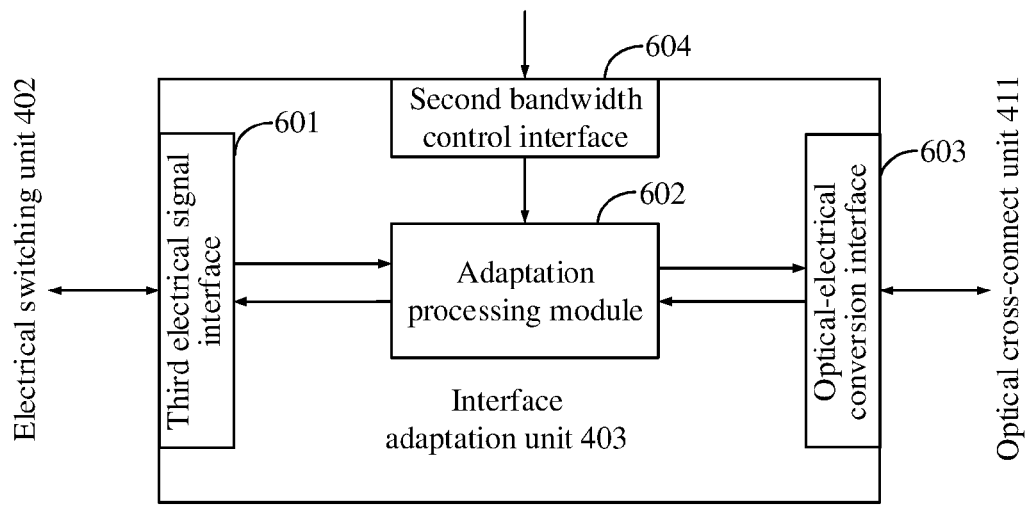
FIG. 6 is a schematic structural diagram of an interface adaptation unit in the service switching system shown in FIG. 4.

Further, a structure of the interface adaptation unit 403 in this embodiment may be shown in FIG. 6. The interface adaptation unit 403 includes a third electrical signal interface 601, an adaptation processing module 602, an optical-electrical conversion interface 603, and a second bandwidth control interface 604.

The adaptation processing module 602 is configured to receive the service data electrical signal from the electrical switching unit 402 using the third electrical signal interface 601, perform adaptation processing according to the adaptation control information that is sent by the bandwidth control unit 420 and received from the second bandwidth control interface 604, and send the adaptation-processed service data electrical signal to the optical-electrical conversion interface 603, and/or receive a service data electrical signal sent by the optical-electrical conversion interface 603, perform adaptation processing according to the adaptation control information that is sent by the bandwidth control unit 420 and received from the second bandwidth control interface 604, and send the adaptation-processed service data electrical signal to the electrical switching unit 402 using the third electrical signal interface 601.

The optical-electrical conversion interface 603 is configured to convert the service data electrical signal received from the adaptation processing module 602 into an optical signal, and send the optical signal to the optical cross-connect unit 411 in the optical cross-connect subrack 410, or convert the service data optical signal received from the optical cross-connect unit 411 into an electrical signal, and send the electrical signal to the adaptation processing module 602.

In actual application, the adaptation processing module 602 may be implemented by a programmable chip such as a field-programmable gate array (FPGA) or an application specific integration circuit (ASIC).

The adaptation control information sent by the bandwidth control unit 420 in this embodiment may include delay information and sending control information. In actual application, the delay information may be time information, for example, 2 millisecond (ms), 3 ms, or 5 ms. The delay information may alternatively be a quantity of information elements that is used to identify a time, for example, a delay time that is equal to five information elements, and if a transmission time for each information element is 0.6 ms, five information elements are actually also 3 ms. The sending control information is used to indicate whether sending is performed or not. The sending control information may be 0 or 1 directly, to indicate whether sending is performed or not.

In this case, the adaptation processing module 602 is further configured to perform receiving processing on the service data electrical signal received from the third electrical signal interface 601, to recover the service data, obtain first link status information from the recovered service data, perform sorting and alignment processing on the recovered service data, and cache the recovered service data, and send the cached service data to the optical-electrical conversion interface 603 according to the sending control information sent by the bandwidth control unit 420 and second link status information, and perform receiving processing on the service data electrical signal received from the optical-electrical conversion interface 603, to recover the service data, obtain second link status information from the recovered service data, cache the recovered service data, read the cached service data according to the delay information sent by the bandwidth control unit 420, and send the read service data to the third electrical signal interface 601 according to the first link status information.

Figure 7:
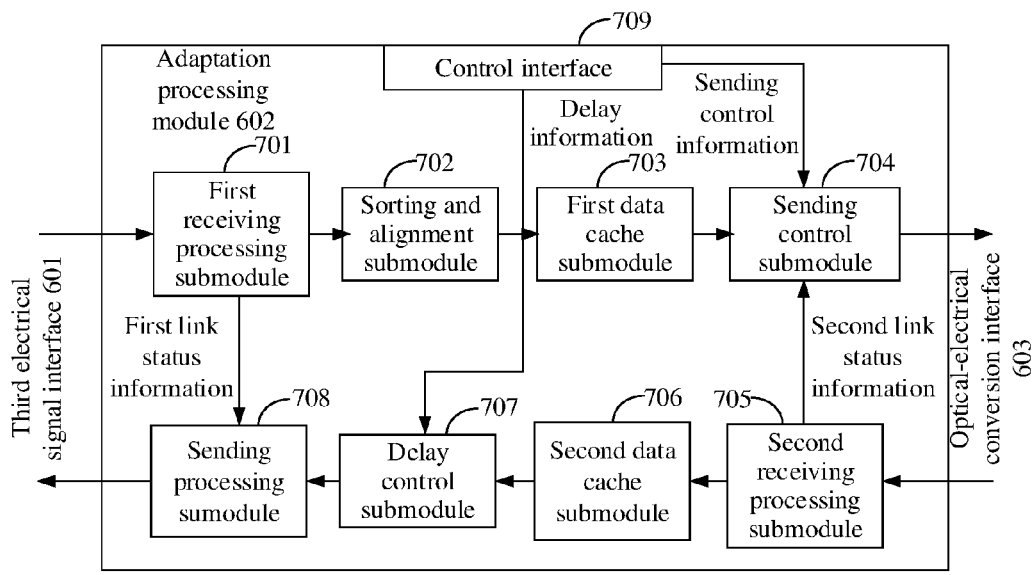
FIG. 7 is a schematic diagram of a logical structure of an adaptation processing module in the interface adaptation unit shown in FIG. 6.

A logical structure of the adaptation processing module 602 in this embodiment may be shown in FIG. 7. The adaptation processing module 602 includes a first receiving processing submodule 701, a sorting and alignment submodule 702, a first data cache submodule 703, a sending control submodule 704, a second receiving processing submodule 705, a second data cache submodule 706, a delay control submodule 707, a sending processing submodule 708, and a control interface 709.

The first receiving processing submodule 701 is configured to receive, from the third electrical signal interface 601, the service data electrical signal sent by the electrical switching unit 402, perform receiving processing to recover the service data, obtain the first link status information from the recovered service data, and send the recovered service data to the sorting and alignment submodule 702, and sending the first link status information to the sending processing submodule 708.

The sorting and alignment submodule 702 is configured to perform sorting and alignment processing on the service data received from the first receiving processing submodule 701, and send the processed service data to the first data cache submodule 703 for caching.

The sending control submodule 704 is configured to receive, using the control interface 709, the sending control information sent by the bandwidth control unit 420, and read the service data from the first data cache submodule 703 and send the read service data to the optical-electrical conversion interface 603 according to the sending control information and the second link status information received from the second receiving processing submodule 705.

The second receiving processing submodule 705 is configured to receive the service data electrical signal from the optical-electrical conversion interface 603, perform receiving processing to recover the service data, obtain the second link status information from the recovered service data, and send the recovered service data to the second data cache submodule 706 for caching, and send the second link status information to the sending control submodule 704.

The delay control submodule 707 is configured to receive, using the control interface 709, the delay information sent by the bandwidth control unit 420, read the service data from the second data cache submodule 706 according to the delay information, and send the service data to the sending processing submodule 708.

The sending processing submodule 708 is configured to send, to the third electrical signal interface 601 according to the first link status information received from the first receiving processing submodule 701, the service data received from the delay control submodule 707.

The optical cross-connect unit 411 in the optical cross-connect subrack 410 shown in FIG. 4 is configured to receive a service data optical signal from one or more service processing subracks 400, perform optical cross-connection for the received optical signal, and output the cross-connected optical signal to the one or more service processing subracks 400.

Figure 8:
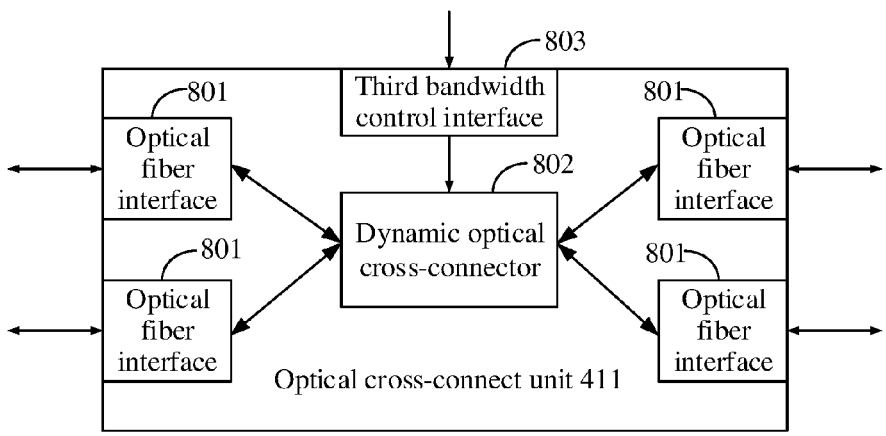
FIG. 8 is a schematic structural diagram of an optical cross-connect unit in the service switching system shown in FIG. 4.

In actual application, the optical cross-connect unit 411 may perform optical cross-connection using a dynamic optical cross-connector, or perform optical cross-connection using a static optical cross-connector. In this embodiment, a dynamic optical cross-connector is used. Further, a structure of the optical cross-connect unit 411 in this embodiment may be shown in FIG. 8. The optical cross-connect unit 411 includes four optical fiber interfaces 801, a dynamic optical cross-connector 802, and a third bandwidth control interface 803.

The dynamic optical cross-connector 802 is configured to receive, using any optical fiber interface 801, a service data optical signal from an interface adaptation unit 403 in one or more service processing subracks 400, perform optical cross-connection according to optical cross-connect control information that is sent by the bandwidth control unit 420 and received using the third bandwidth control interface 801, and output the cross-connected optical signal to an interface adaptation unit 403 in one or more service processing subracks 400 using any optical fiber interface 801. In actual application, the optical cross-connect control information may be a source optical port number and a destination optical port number. The dynamic optical cross-connector 802 performs optical cross-connect directly according to the source optical port number and the destination optical port number.

Figure 9:
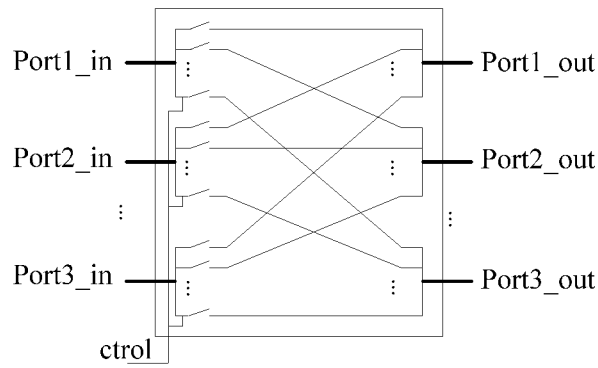
FIG. 9 is a schematic diagram of a logical structure of a dynamic optical cross-connector in the optical cross-connect unit shown in FIG. 8.

Further, a logical structure of the dynamic optical cross-connector 802 in this embodiment is shown in FIG. 9. The dynamic optical cross-connector 802 has one control end, multiple optical input ports, and multiple optical output ports. The multiple optical input ports are connected to the multiple optical output ports using multiple optical switches, and the control end is connected to each optical switch. The control end controls each optical switch to be on or off according to the optical cross-connect control information received from the bandwidth control unit 420, to implement dynamic optical cross-connect.

It should be noted that the dynamic optical cross-connector and the static optical cross-connector are both commonly used optical cross-connect components in an optical communications technology. For the dynamic optical cross-connector shown in FIG. 9 and a static optical cross-connector shown in FIG. 14 to be described later in the specification, only their logical structures are illustrated. Their physical structures, however, have many different forms and are not further described in the specification.

As shown in FIG. 4, the service processing unit 401 in this embodiment sends obtained traffic information to the bandwidth control unit 420 during dynamic service processing.

Correspondingly, during dynamic service processing, the bandwidth control unit 420 in this embodiment is configured to obtain service configuration information and receive the traffic information, determine, according to the service configuration information and the traffic information, an optical connection bandwidth required between each interface adaptation unit 403 and each optical cross-connect unit 411, generate switching control information, adaptation control information, and optical cross-connect control information according to the determined optical connection bandwidth required between each interface adaptation unit 403 and each optical cross-connect unit 411, and send the switching control information, the adaptation control information, and the optical cross-connect control information to the electrical switching unit 402, the interface adaptation unit 403, and the optical cross-connect unit 411, respectively, and/or during static service processing, the bandwidth control unit 420 in this embodiment is configured to obtain service configuration information, determine, according to the service configuration, an optical connection bandwidth required between each interface adaptation unit 403 and each optical cross-connect unit 411, generate switching control information, adaptation control information, and optical cross-connect control information according to the determined optical connection bandwidth required between each interface adaptation unit 403 and each optical cross-connect unit 411, and send the switching control information, the adaptation control information, and the optical cross-connect control information to the electrical switching unit 402, the interface adaptation unit 403, and the optical cross-connect unit 411, respectively.

Figure 10:
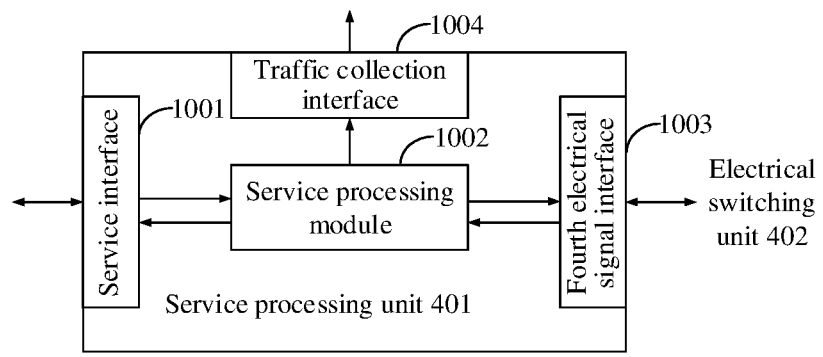
FIG. 10 is a schematic structural diagram of a service processing unit in the service switching system shown in FIG. 4.

Further, a structure of the service processing unit 401 in this embodiment may be shown in FIG. 10. The service processing unit 401 includes a service interface 1001, a service processing module 1002, a fourth electrical signal interface 1003, and a traffic collection interface 1004.

The service processing module 1002 is configured to receive the service data electrical signal from outside the system using the service interface 1001, perform service processing, and send the processed service data electrical signal to the electrical switching unit 402 using the fourth signal interface 1003, or receive, using the fourth signal interface 1003, the service data electrical signal sent by the electrical switching unit 402, perform service processing, and send the processed service data electrical signal to outside the system using the service interface 1001, and during a dynamic service processing process, collect traffic information of service data, and send the traffic information to the bandwidth control unit 420 using the traffic collection interface 1004. In actual application, the service processing module 1002 may be implemented by a programmable chip such as an FPGA or an ASIC.

Figure 11:
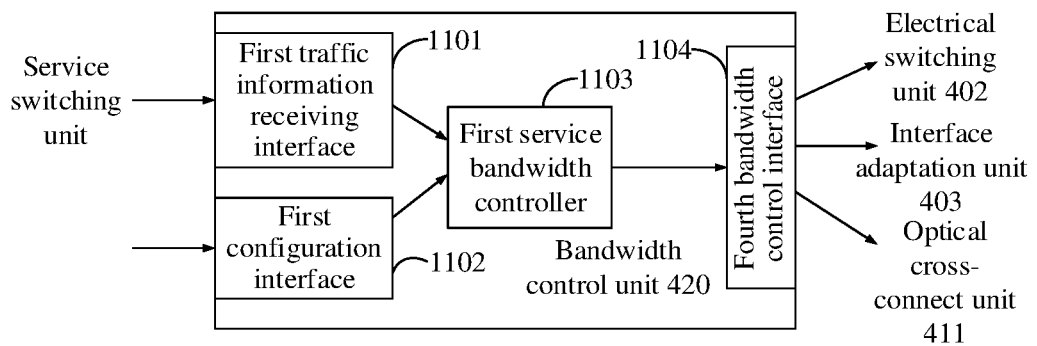
FIG. 11 is a schematic structural diagram of a bandwidth control unit in the service switching system shown in FIG. 4.

A structure of the bandwidth control unit 420 may be shown in FIG. 11. The bandwidth control unit 420 includes a first traffic information receiving interface 1101, a first configuration interface 1102, a first service bandwidth controller 1103, and a fourth bandwidth control interface 1104.

The first service bandwidth controller 1103 is configured to, during a dynamic service, obtain the service configuration information using the first configuration interface 1102 and receive the traffic information using the first traffic information receiving interface 1101, determine, according to the service configuration information and the traffic information, the optical connection bandwidth required between each interface adaptation unit 403 and each optical cross-connect unit 411, generate the switching control information, the adaptation control information, and the optical cross-connect control information according to the determined optical connection bandwidth required between each interface adaptation unit 403 and each optical cross-connect unit 411, and send, using the fourth bandwidth control interface 1104, the switching control information, the adaptation control information, and the optical cross-connect control information to the electrical switching unit 402, the interface adaptation unit 403, and the optical cross-connect unit 411, respectively, and/or during a static service, obtain the service configuration information using the first configuration interface 1102, determine, according to the service configuration information, the optical connection bandwidth required between each interface adaptation unit 403 and each optical cross-connect unit 411, generate the switching control information, the adaptation control information, and the optical cross-connect control information according to the determined optical connection bandwidth required between each interface adaptation unit 403 and each optical cross-connect unit 411, and send, using the fourth bandwidth control interface 1104, the switching control information, the adaptation control information, and the optical cross-connect control information to the electrical switching unit 402, the interface adaptation unit 403, and the optical cross-connect unit 411, respectively. In this embodiment, the first service bandwidth controller 1103 may be implemented by a central processing unit (CPU) system.

Embodiment 3

Figure 12:
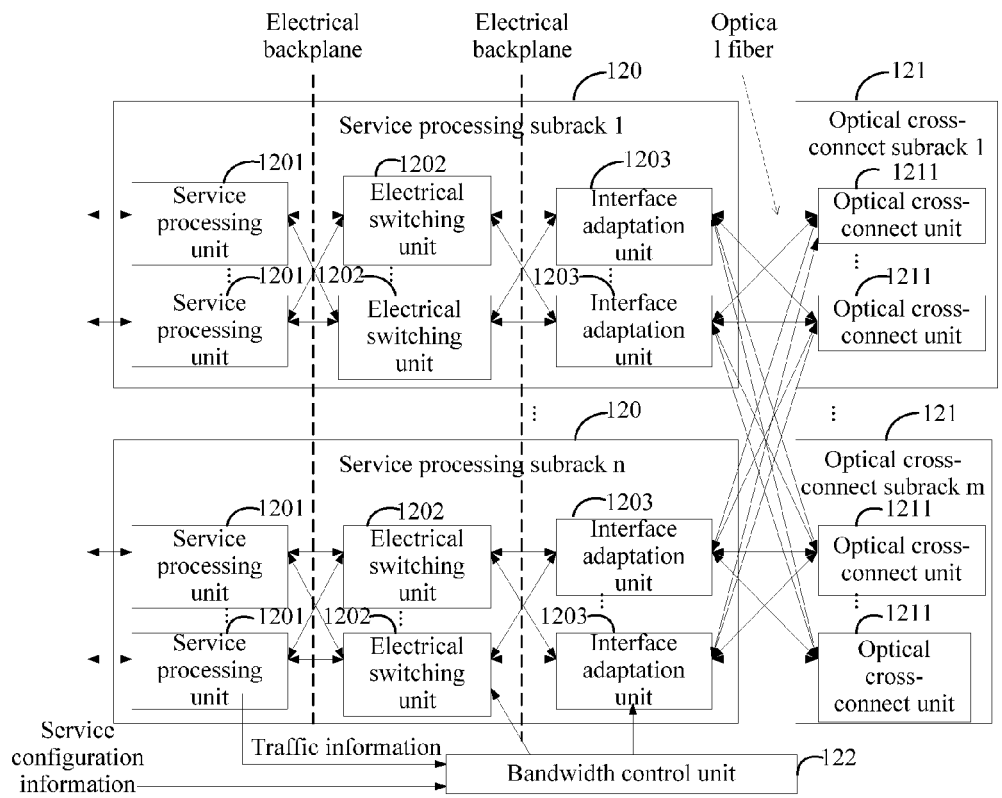
FIG. 12 is a schematic structural diagram of Embodiment 3 of a service switching system according to an embodiment of the present disclosure.

As shown in FIG. 12, similar to the embodiment shown in FIG. 4, a service switching system in the Embodiment 3 of the present disclosure also includes multiple service processing subracks 120, multiple optical cross-connect subracks 121, and a bandwidth control unit 122.

In addition, an internal structure and connection relationship of the service processing subracks 120, a connection relationship between the service processing subracks 120 and the optical cross-connect subracks 121, and a connection relationship between the bandwidth control unit 122 and the service processing subracks 120 are all the same as those in the embodiment shown in FIG. 4. Details are not described herein again.

Differences from the embodiment shown in FIG. 4 lie in that, in this embodiment, a static optical cross-connector is used in an optical cross-connect unit 1211, and optical cross-connect control is implemented by the bandwidth control unit 122 by controlling optical-electrical conversion interfaces of interface adaptation units 1203 in the service processing subracks 120. Therefore, in this embodiment, the bandwidth control unit 122 does not need to send control information to the optical cross-connect unit 1211 in the optical cross-connect subrack 121.

Figure 13:
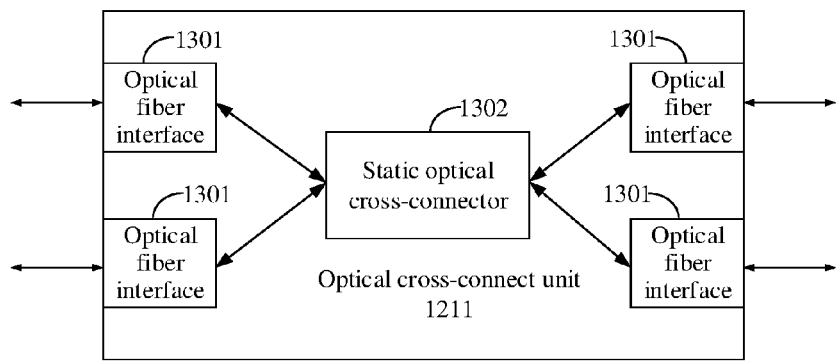
FIG. 13 is a schematic structural diagram of an optical cross-connect unit in the service switching system shown in FIG. 12.

Further, the optical cross-connect unit 1211 in this embodiment may be shown in FIG. 13. The optical cross-connect unit 1211 includes four optical fiber interfaces 1301 and a static optical cross-connector 1302.

The static cross-connector 1302 is configured to receive, using any optical fiber interface 1301, a service data optical signal from one or more service processing subracks 120, perform optical cross-connection according to a fixed connection relationship between an optical input port and an optical output port of the static cross-connector 1302, and output the cross-connected optical signal to the one or more service processing subracks 120 using any optical fiber interface 1301.

Correspondingly, an optical-electrical conversion interface of an interface adaptation unit 1203 in this embodiment is configured to receive optical signal wavelength adjustment information from the bandwidth control unit 122 using a second bandwidth control interface, determine a wavelength for optical signal sending according to the optical signal wavelength adjustment information, and convert a service data electrical signal received from an adaptation processing module into an optical signal according to the determined optical signal wavelength, and send the optical signal to the static optical cross-connector 1302 in the optical cross-connect unit 1211, or convert a service data optical signal received from the static optical cross-connector 1302 in the optical cross-connect unit 1211 into an electrical signal, and send the electrical signal to an adaptation processing module. In actual application, the optical signal wavelength adjustment information may be a source optical port number and an adjusted wavelength. Herein, the adjusted wavelength in effect identifies a destination optical port.

It can be learnt that, in this embodiment, the static optical cross-connector 1302 and the optical-electrical conversion interface of the interface adaptation unit 1203 cooperate with each other to change an optical wavelength according to the optical signal wavelength adjustment information sent by the bandwidth control unit 122 in order to implement cross-connect for signals of different optical wavelengths. In other words, the optical cross-connect unit 1211 in this embodiment is by itself a static connection. Therefore, the optical cross-connect unit 1211 does not need to be controlled by the bandwidth control unit 122.

Figure 14:
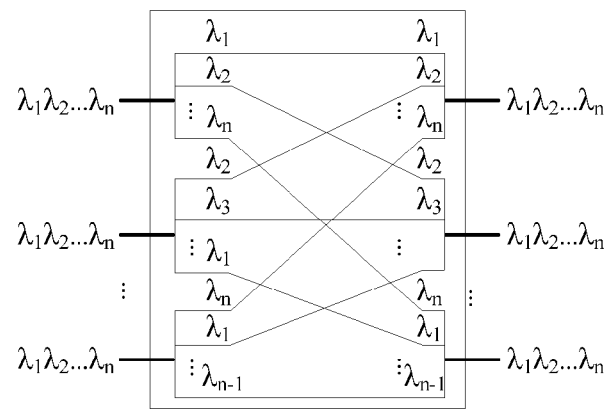
FIG. 14 is a schematic diagram of a logical structure of a static optical cross-connector in the optical cross-connect unit shown in FIG. 13.

A logical structure of the static optical cross-connector 1302 used in this embodiment is shown in FIG. 14. The optical input ports and the optical output ports inside the static optical cross-connector 1302 are fixedly connected. Optical cross-connect adjustment is implemented, using the optical-electrical conversion interface of the interface adaptation unit 1203 to adjust a wavelength of an input optical signal.

The bandwidth control unit 122 in this embodiment is configured to, during dynamic service processing, obtain service configuration information and receive traffic information, determine, according to the service configuration information and the traffic information, an optical connection bandwidth required between each interface adaptation unit 1203 and each optical cross-connect unit 1211, generate switching control information, adaptation control information, and the optical signal wavelength adjustment information according to the determined optical connection bandwidth required between each interface adaptation unit 1203 and each optical cross-connect unit 1211, send the switching control information to the electrical switching unit 1202, and send the adaptation control information and the optical signal wavelength adjustment information to the interface adaptation unit 1203, and/or during a static service, obtain service configuration information, determine, according to the service configuration information, an optical connection bandwidth required between each interface adaptation unit 1203 and each optical cross-connect unit 1211, generate switching control information, adaptation control information, and the optical signal wavelength adjustment information according to the determined optical connection bandwidth required between each interface adaptation unit 1203 and each optical cross-connect unit 1211, send the switching control information to the electrical switching unit 1202, and send the adaptation control information and the optical signal wavelength adjustment information to the interface adaptation unit 1203.

Figure 15:
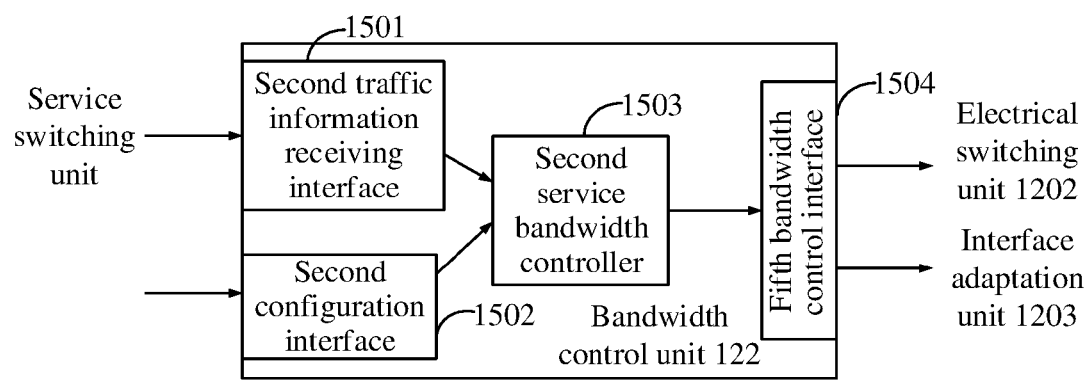
FIG. 15 is a schematic structural diagram of a bandwidth control unit in the service switching system shown in FIG. 12.

Further, a structure of the bandwidth control unit 122 may be shown in FIG. 15. The bandwidth control unit 122 includes a second traffic information receiving interface 1501, a second configuration interface 1502, a second service bandwidth controller 1503, and a fifth bandwidth control interface 1504.

The second service bandwidth controller 1503 is configured to during a dynamic service, obtain the service configuration information using the second configuration interface 1502 and receive the traffic information using the second traffic information receiving interface 1501, determine, according to the service configuration information and the traffic information, the optical connection bandwidth required between each interface adaptation unit 1203 and each optical cross-connect unit 1211, generate the switching control information, the adaptation control information, and the optical signal wavelength adjustment information according to the determined optical connection bandwidth required between each interface adaptation unit 1203 and each optical cross-connect unit 1211, and using the fifth bandwidth control interface 1504, send the switching control information to the electrical switching unit 1202, and send the adaptation control information and the optical signal wavelength adjustment information to the interface adaptation unit 1203, and/or during a static service, obtain the service configuration information using the second configuration interface 1502, determine, according to the service configuration information, the optical connection bandwidth required between each interface adaptation unit 1203 and each optical cross-connect unit 1211, generate the switching control information, the adaptation control information, and the optical signal wavelength adjustment information according to the determined optical connection bandwidth required between each interface adaptation unit 1203 and each optical cross-connect unit 1211, and using the fifth bandwidth control interface 1504, send the switching control information to the electrical switching unit 1202, and send the adaptation control information and the optical signal wavelength adjustment information to the interface adaptation unit 1203.

A person skilled in the art can understand that, in actual application, the bandwidth control unit 122 in the service switching system may be a device independent of the service processing subrack 120 or the optical cross-connect subrack 121, or is integrated into the service processing subrack 120 or the optical cross-connect subrack 121.

In addition, two or three of the service processing unit 1201, the electrical switching unit 1202, and the interface adaptation unit 1203 in the service processing subrack 120 are integrated into one board.

It can be learnt from the embodiments shown in FIG. 3A, FIG. 3B, FIG. 4, and FIG. 12 that, in the service switching system provided in the embodiments of the present disclosure, an optical cross-connect subrack is used, instead of an electrical switching subrack used in the other approaches to implement interconnection between different service processing subracks. In this way, two electrical-to-optical conversions and two optical-to-electrical conversions during an inter-subrack connection process in the other approaches are reduced to one electrical-to-optical conversion and one optical-to-electrical conversion. Therefore, a quantity of optical modules for inter-subrack connection is reduced, and system costs and system power consumption are reduced, that is, interconnection costs of the service switching system are reduced.

In addition, a rate of an optical signal between service processing subracks is independent of a rate of an optical switching subrack. Therefore, when interconnection rates between the service processing subracks are increased, an existing optical cross-connect subrack can still be used, with no concurrent upgrade caused. Hence, an upgrade process is simplified and upgrade costs of the system are reduced.

The following embodiments of the service switching method provided in the embodiments of the present disclosure.

Figure 16A:
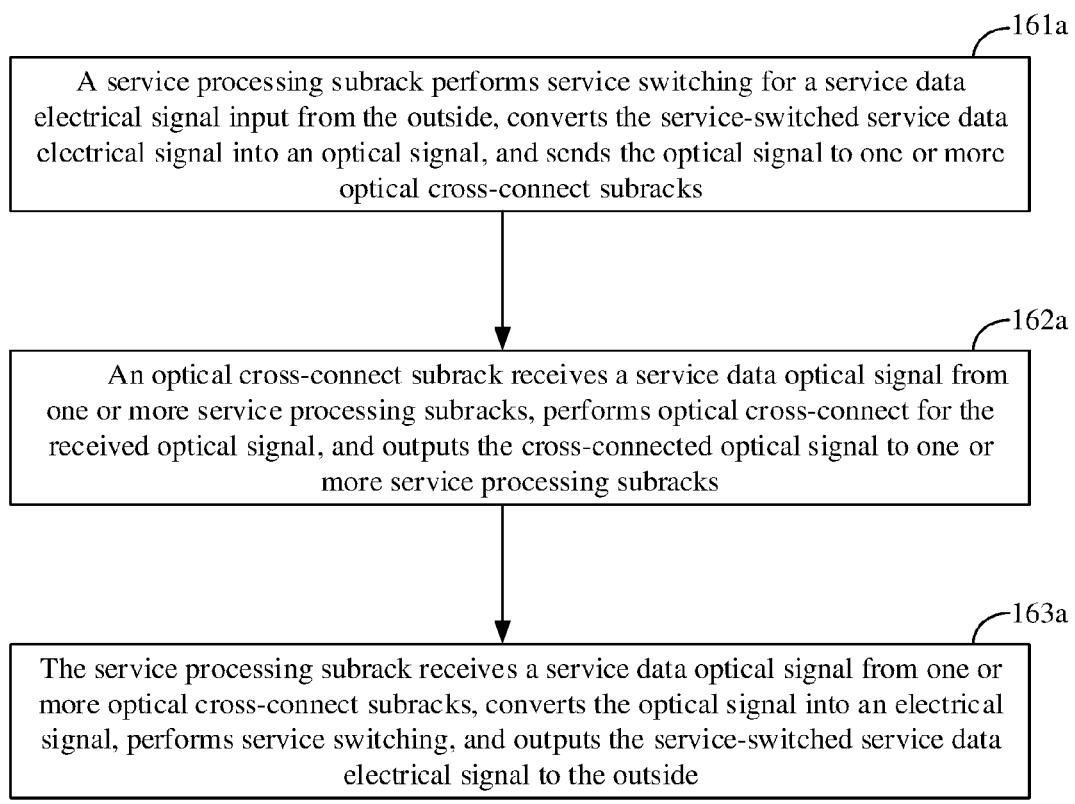
FIG. 16A is a flowchart of a service switching method according to an embodiment of the present disclosure.

As shown in FIG. 16A, a service switching method in an embodiment of the present disclosure corresponds to the service switching system shown in FIG. 3A, and includes the following steps.

Step 161a: A service processing subrack performs service switching for a service data electrical signal input from the outside, converts the service-switched service data electrical signal into an optical signal, and sends the optical signal to one or more optical cross-connect subracks.

Step 162a: An optical cross-connect subrack receives a service data optical signal from one or more service processing subracks, performs optical cross-connect for the received optical signal, and outputs the cross-connected optical signal to one or more service processing subracks.

Step 163a: The service processing subrack receives a service data optical signal from one or more optical cross-connect subracks, converts the optical signal into an electrical signal, performs service switching, and outputs the service-switched service data electrical signal to the outside.

Figure 16B:
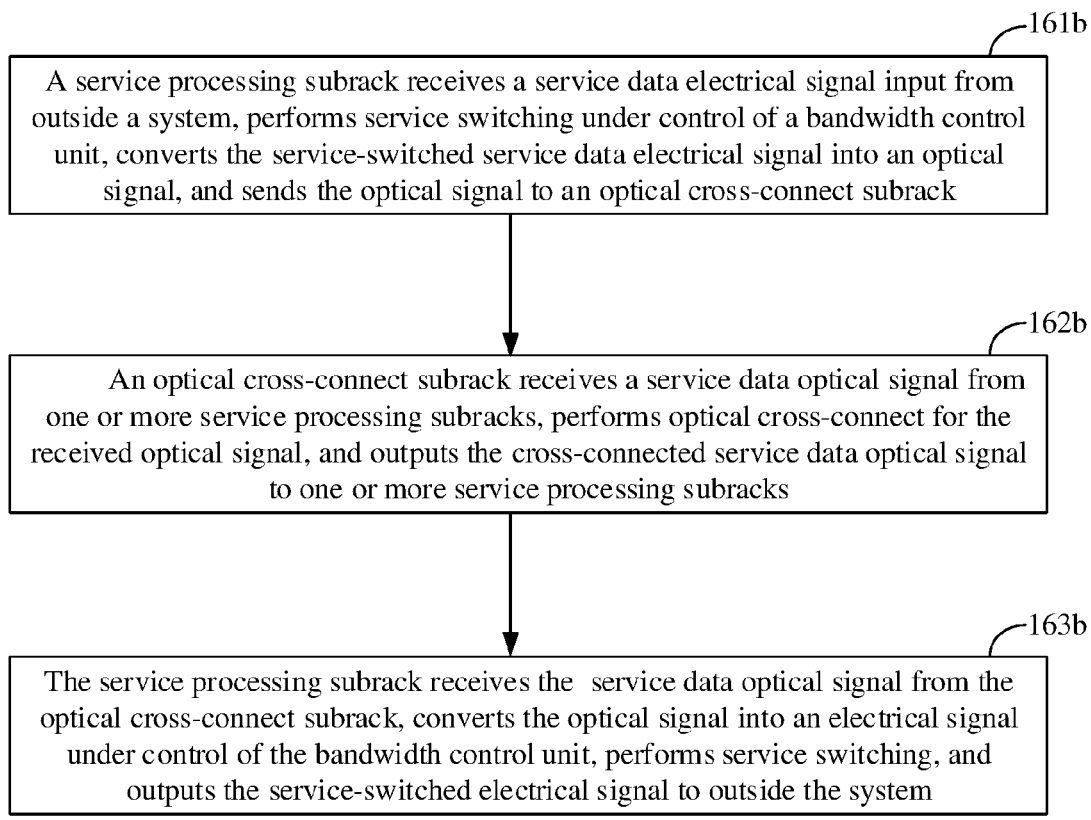
FIG. 16B is another flowchart of a service switching method according to an embodiment of the present disclosure.

As shown in FIG. 16B, a service switching method in an embodiment of the present disclosure corresponds to the service switching system shown in FIG. 3B, and includes the following steps.

Step 161b: A service processing subrack receives a service data electrical signal input from outside the system, performs service switching under control of a bandwidth control unit, converts the service-switched service data electrical signal into an optical signal, and sends the optical signal to an optical cross-connect subrack.

Step 162b: The optical cross-connect subrack receives a service data optical signal from one or more service processing subracks, performs optical cross-connect for the received optical signal, and outputs the cross-connected optical signal to one or more service processing subracks.

Step 163b: The service processing subrack receives the service data optical signal from the optical cross-connect subrack, converts the optical signal into an electrical signal under control of the bandwidth control unit, performs service switching, and outputs the service-switched service data electrical signal to outside the system.

In this embodiment, the service processing subrack includes at least one service processing unit, at least one electrical switching unit, and at least one interface adaptation unit.

Step 161b may further include receiving, by the service processing unit, the service data electrical signal input from outside the system, performing service processing, and sending the service-processed service data electrical signal to the electrical switching unit, receiving, by the electrical switching unit, the service data electrical signal sent by the service processing unit, performing service switching according to switching control information sent by the bandwidth control unit, and sending the service-switched service data electrical signal to the interface adaptation unit, and receiving, by the interface adaptation unit, the service data electrical signal sent by the electrical switching unit, converting service data from the electrical signal into an optical signal according to adaptation control information sent by the bandwidth control unit, and sending the optical signal to the optical cross-connect subrack.

Step 163b in this embodiment may further include receiving, by the interface adaptation unit, the service data optical signal sent by the optical cross-connect subrack, converting service data from the optical signal into an electrical signal according to the adaptation control information sent by the bandwidth control unit, sending the electrical signal to the electrical switching unit, receiving, by the electrical switching unit, the service data electrical signal from the interface adaptation unit, performing service switching according to the switching control information sent by the bandwidth control unit, sending the service-switched service data electrical signal to the service processing unit, receiving and processing, by the service processing unit, the service-switched service data electrical signal sent by the electrical switching unit, and outputting the processed service data electrical signal to outside the system.

In this embodiment, the optical cross-connect subrack includes at least one optical cross-connect unit.

Step 162b may be implemented by the optical cross-connect unit.

In this embodiment, the step of receiving, by the interface adaptation unit, the service data electrical signal sent by the electrical switching unit, converting service data from the electrical signal into an optical signal according to adaptation control information sent by the bandwidth control unit, and sending the optical signal to the optical cross-connect subrack may include receiving, by the interface adaptation unit, the service data electrical signal sent by the electrical switching unit, performing receiving processing to recover the service data, obtaining first link status information from the recovered service data, performing sorting and alignment processing on the recovered service data, and caching the recovered service data, and converting the cached service data into a service data optical signal and sending the optical signal to the optical cross-connect unit in the optical cross-connect subrack according to sending control information sent by the bandwidth control unit and second link status information.

In this embodiment, the step of receiving, by the interface adaptation unit, the service data optical signal sent by the optical cross-connect subrack, converting service data from the optical signal into an electrical signal according to the adaptation control information sent by the bandwidth control unit, and sending the electrical signal to the electrical switching unit may include receiving, by the interface adaptation unit, the service data optical signal sent by the optical cross-connect unit in the optical cross-connect subrack, converting the optical signal into an electrical signal, performing receiving processing to recover the service data, obtaining second link status information from the recovered service data, caching the recovered service data, reading the cached service data according to delay information sent by the bandwidth control unit, and sending the read service data to the electrical switching unit according to first link status information.

The service processing unit in this embodiment sends obtained traffic information to the bandwidth control unit during dynamic service processing.

When the optical cross-connect unit includes a dynamic optical cross-connector, during dynamic service processing, the bandwidth control unit determines, according to service configuration information and the traffic information, an optical connection bandwidth required between each interface adaptation unit and each optical cross-connect unit, generates switching control information, adaptation control information, and optical cross-connect control information according to the determined optical connection bandwidth required between each interface adaptation unit and each optical cross-connect unit, and sends the switching control information, the adaptation control information, and the optical cross-connect control information to the electrical switching unit, the interface adaptation unit, and the dynamic optical cross-connector in the optical cross-connect unit, respectively, and/or during static service processing, the bandwidth control unit obtains service configuration information, determines, according to the service configuration, an optical connection bandwidth required between each interface adaptation unit and each optical cross-connect unit, generates switching control information, adaptation control information, and optical cross-connect control information according to the determined optical connection bandwidth required between each interface adaptation unit and each optical cross-connect unit, and sends the switching control information, the adaptation control information, and the optical cross-connect control information to the electrical switching unit, the interface adaptation unit, and the optical cross-connect unit, respectively. For details, reference is made to the foregoing description of the Embodiment 2.

When the optical cross-connect unit includes a static optical cross-connector, the bandwidth control unit determines, during dynamic service processing, according to service configuration information and the traffic information, an optical connection bandwidth required between each interface adaptation unit and each optical cross-connect unit, generates switching control information, adaptation control information, and optical signal wavelength adjustment information according to the determined optical connection bandwidth required between each interface adaptation unit and each optical cross-connect unit, sends the switching control information to the electrical switching unit, and sends the adaptation control information and the optical signal wavelength adjustment information to the interface adaptation unit, and/or during a static service, the bandwidth control unit obtains service configuration information, determines, according to the service configuration information, an optical connection bandwidth required between each interface adaptation unit and each optical cross-connect unit, generates switching control information, adaptation control information, and optical signal wavelength adjustment information according to the determined optical connection bandwidth required between each interface adaptation unit and each optical cross-connect unit, sends the switching control information to the electrical switching unit, and sends the adaptation control information and the optical signal wavelength adjustment information to the interface adaptation unit. For details, reference is made to the foregoing description of the Embodiment 3.

In this case, after receiving the optical signal wavelength adjustment information sent by the bandwidth control unit, the interface adaptation unit determines a wavelength for optical signal sending according to the optical signal wavelength adjustment information, converts the service data electrical signal received from the electrical switching unit into an optical signal according to the determined optical signal wavelength, and sends the optical signal to the static cross-connector in the optical cross-connect unit.

The service configuration information in this embodiment may be obtained from an external input, and may include optical connection bandwidth allocation policy information, static service connection information, and static service bandwidth information.

In this case, the bandwidth control unit performs bandwidth allocation for a static service according to the optical connection bandwidth allocation policy information, the static service connection information, and the static service bandwidth information, and performs bandwidth allocation for a dynamic service according to the optical connection bandwidth allocation policy information and dynamic service connection information obtained from the traffic information, calculates optical connection bandwidths required between interface adaptation units, and determines the optical connection bandwidth required between each interface adaptation unit and each optical cross-connect unit, and generates the switching control information and the adaptation control information according to the determined optical connection bandwidth required between each interface adaptation unit and each optical cross-connect unit.

Generally, a service switching system should be able to support both static and dynamic services. Therefore, configuration information needs to contain static service connection information and static service bandwidth information. Certainly, if only dynamic service support is required, the static service connection information and the static service bandwidth information may not be contained. Correspondingly, if only static service support is required and dynamic service support is not required, the bandwidth control unit does not need to receive traffic information from the service processing unit.

It should be noted that the prior-art service processing subrack generally integrates a bandwidth control function such as the foregoing bandwidth allocation function. A person skilled in the art can understand that, when the bandwidth control unit in this embodiment of the present disclosure implements a bandwidth control function, reference may be made to a method for implementing a bandwidth control function in the other approaches.

In addition, in this embodiment of the present disclosure, an additional bandwidth may be pre-configured between each service processing subrack and each optical cross-connect subrack in order to further ensure non-blocking system services.

Actually, non-blocking system services depend on interconnection bandwidths between interface adaptation units and optical cross-connect units. Assuming that access service bandwidths, of service processing units, that need to be scheduled by optical cross-connect units are M1, M2, . . . , and Ma (a is a number of an interface adaptation unit that a service needs to access), respectively, a required total access bandwidth is $\Sigma M$. If interconnection bandwidths that can be supported between interface adaptation units and optical cross-connect units are K1, K2, . . . , Kb (b is a number of an interface adaptation unit included in the system), a total interconnection bandwidth that can be supported by the system is $\Sigma K$.

An optical connection bandwidth between any two interface adaptation units that interwork via an optical cross-connect unit is Knm, where n is a number of a source interface adaptation unit, and m is a number of a destination interface adaptation unit. In this case, to implement non-blocking services for all interface adaptation units, it is only required that $M1 \leq \Sigma K1m \leq K1$, $M2 \leq \Sigma K2m \leq K2$, . . . hold. It can be learnt that, non-blocking system services can be implemented provided that the total bandwidth supportable by the system is greater than or equal to the required total access bandwidth, that is, when $\Sigma K \geq \Sigma Knm \geq \Sigma M$ holds.

In this embodiment, an additional bandwidth is configured between the interface adaptation units and the optical cross-connect units. It is assumed that the additional bandwidth is $\Delta M$. Then, $\Sigma K \geq \Sigma M + \Delta M$.

The additional bandwidth may be implemented in the following two manners.

One manner is increasing a transmission rate of each service path in connection links between the service processing units and the optical cross-connect units. The other manner is increasing service paths in connection links between the service processing units and the optical cross-connect units. A person skilled in the art can understand that, specific methods for increasing a transmission rate of a service path and increasing service paths may be implemented with reference to methods in the other approaches.

In this case, with the additional bandwidth and concurrent control by the service bandwidth control unit for the optical cross-connect unit, the interface adaptation unit, and the electrical switching unit, existing services suffer no impairment during optical cross-connect adjustment.

Further, before the optical cross-connect unit performs connection adjustment, the bandwidth control unit may send adaptation control information to an interface adaptation unit on a to-be-adjusted link to switch service data on the to-be-adjusted link to a redundant link brought by the additional bandwidth, and send adaptation control information to the interface adaptation unit on the adjusted link again to switch the service data from the redundant link back to the adjusted link after the optical cross-connect unit completes connection adjustment, or send adaptation control information to an interface adaptation unit on a to-be-adjusted link to stop service data sending of the interface adaptation unit on the to-be-adjusted link and cache, in the interface adaptation unit, service data that is sent by the electrical switching unit to the interface adaptation unit before the optical cross-connect unit performs connection adjustment, and send adaptation control information to the interface adaptation unit on the adjusted link again to resume service data sending of the interface adaptation unit and discharge the cached service data using a redundant link brought by the additional bandwidth after the optical cross-connect unit completes connection adjustment.

It can be learnt from the foregoing embodiments that, in the service switching system and the service switching method that are provided in the embodiments of the present disclosure, an optical cross-connect subrack is used, instead of an electrical switching subrack used in the other approaches to implement interconnection between different service processing subracks. In this way, two electrical-to-optical conversions and two optical-to-electrical conversions during an inter-subrack connection process in the other approaches are reduced to one electrical-to-optical conversion and one optical-to-electrical conversion. Therefore, a quantity of optical modules for inter-subrack connection is reduced, and system costs and system power consumption are reduced, that is, interconnection costs of the service switching system are reduced.

In addition, a rate of an optical signal between service processing subracks is independent of a rate of an optical switching subrack. Therefore, when interconnection rates between the service processing subracks are increased, an existing optical cross-connect subrack can still be used, with no concurrent upgrade caused. Hence, an upgrade process is simplified and upgrade costs of the system are reduced.

Moreover, unlike the other approaches which demands the costs of two optical-to-electrical conversions, two electrical-to-optical conversions, and one electrical switching, the service switching system provided in the embodiments of the present disclosure requires only one optical-to-electrical conversion and one electrical-to-optical conversion because an optical cross-connect subrack is used for interconnection. Therefore, there will be no service blocking in the entire system provided that a total bandwidth supportable by the system is greater than or equal to a required total access bandwidth.

Further, with an additional bandwidth configured for the system, bandwidth allocation and concurrent control for optical cross-connect and electrical switching can be used to further ensure non-blocking switching of system services. This ensures that existing services suffer no impairment during optical cross-connect adjustment.

It should be noted that an apparatus in the embodiments of the present disclosure may be further implemented by a chip or an entity, or may be implemented by a product having a specific function.

The embodiments of the service switching method provided in the embodiments of the present disclosure are basically similar to the embodiments of the service switching system. Therefore, the embodiments of the service switching method are only briefly described. For related parts, reference is made to the descriptions of such parts in the embodiments of the service switching system.

For ease of description, the foregoing apparatus is divided by function into various units that are described separately. Certainly, when the present disclosure is implemented, functions of units may be implemented in one or more pieces of software and/or hardware.

It can be learnt from the descriptions of the foregoing implementations that, a person skilled in the art can clearly understand that the present disclosure may be implemented using software in addition to a necessary universal hardware platform. Based on such an understanding, the technical solutions of the present disclosure essentially or the part contributing to the other approaches may be implemented in a form of a software product. The computer software product may be stored in a storage medium, such as a read only memory (ROM)/random access memory (RAM), a magnetic disk, or an optical disc, and includes several instructions for instructing a computer device (which may be a personal computer, a server, a network device, or the like) to perform the methods described in the embodiments or some parts of the embodiments of the present disclosure.

It should be noted that in the specification, relational terms such as first and second are only used to distinguish one entity or operation from another, and do not necessarily require or imply that any actual relationship or sequence exists between these entities or operations. Moreover, the terms "include," "comprise," or their any other variant is intended to cover a non-exclusive inclusion such that a process, a method, an article, or a device that includes a list of elements not only includes those elements but also includes other elements which are not expressly listed, or further includes elements inherent to the process, method, article, or device. Without being subject to further limitations, an element defined by a phrase "including a . . . " does not exclude presence of other identical elements in the process, method, article, or device that includes the element.

The embodiments in the specification are all described in a related manner, for same or similar parts in the embodiments, mutual reference may be made, and each embodiment focuses on a difference from other embodiments.

Especially, a system embodiment is basically similar to a method embodiment, and therefore is described briefly. For related parts, reference is made to the descriptions of such parts in the method embodiment.

The foregoing descriptions are merely examples of embodiments of the present disclosure, but are not intended to limit the protection scope of the present disclosure. Any modification, equivalent replacement, or improvement made without departing from the spirit and principle of the present disclosure shall fall within the protection scope of the present disclosure.

What is claimed is:

1. A service switching system, comprising:
   a bandwidth controller;
   at least one optical cross-connect subrack coupled to the bandwidth controller;
   at least two service processing subracks, each service processing subrack being coupled to the bandwidth controller and being coupled to the optical cross-connect subrack using an optical fiber, each service processing subrack comprising at least one interface, and each service processing subrack being configured to either:
      perform service switching for an externally inputted service data electrical signal, convert the service-switched service data electrical signal into an optical signal, and send the optical signal to the optical cross-connect subrack; or
      receive a service data optical signal from the optical cross-connect subrack, convert the optical signal into an electrical signal, perform service switching, and output the service-switched service data electrical signal,
   the at least one optical cross-connect subrack being configured to:
      receive a service data optical signal from one of the service processing subracks;
      perform optical cross-connection for the received optical signal; and
      output the cross-connected optical signal to the one of the service processing subracks, and
   the bandwidth controller being configured to perform bandwidth control for the service processing subracks by sending adaptation control information and optical signal wavelength adjustment information to the interfaces of the service processing subracks when the service processing subracks perform service switching for different services.

2. The service switching system of claim 1, wherein each service processing subrack comprises:
   at least one service processor; and
   at least one electrical switch coupled to the at least one service processor and the at least one interface, the at least one service processor being configured to either:
      perform service processing for an externally inputted service data electrical signal and send the service-processed service data electrical signal to the at least one electrical switch; or
      receive and process a service-switched service data electrical signal from the at least one electrical switch and output the processed service data electrical signal, the at least one electrical switch being configured to either:
         receive the service data electrical signal from the at least one service processor, perform service switching according to switching control information from the bandwidth controller, and send the service-switched service data electrical signal to the at least one interface; or
         receive a service data electrical signal from the at least one interface, perform service switching according to switching control information from the bandwidth controller, and send the service-switched service data electrical signal to the at least one service processor, and
   the at least one interface being configured to either:
      receive the service data electrical signal from the at least one electrical switch, convert service data from the electrical signal into an optical signal according to the adaptation control information from the bandwidth controller, and send the optical signal to the optical cross-connect subrack; or
      receive a service data optical signal from an optical cross-connect subrack, convert service data from the optical signal into an electrical signal according to the adaptation control information from the bandwidth controller, and send the electrical signal to the at least one electrical switch.

3. The service switching system of claim 1, wherein either the bandwidth controller is a device independent of the service processing subrack or the optical cross-connect subrack, or the bandwidth controller is integrated into the service processing subrack or the optical cross-connect subrack.

4. The service switching system of claim 2, wherein the optical cross-connect subrack comprises at least one optical cross-connector, and the at least one optical cross-connector comprises:
   a memory comprising instructions; and
   a processor coupled to the memory, the instructions causing the processor to be configured to:
      receive a service data optical signal from one of the service processing subracks;
      perform optical cross-connection for the received optical signal; and
      output the cross-connected optical signal to the one of the service processing subracks.

5. The service switching system of claim 2, wherein the at least one electrical switch comprises:
   a first electrical signal interface;
   an electrical switching processor coupled to the first electrical signal interface;
   a second electrical signal interface coupled to the electrical switching processor; and
   a first bandwidth control interface coupled to the electrical switching processor, the electrical switching processor being configured to either:
      receive the service data electrical signal from the at least one service processor using the first electrical signal interface, perform service switching according to the switching control information from the bandwidth controller received from the first bandwidth control interface, and send the service-switched service data electrical signal to the at least one interface using the second electrical signal interface; or
      receive the service data electrical signal from the at least one interface using the second signal interface, perform service switching according to the switching control information from the bandwidth controller received from the first bandwidth control interface, and send the service-switched service data electrical signal to the at least one service processor using the first electrical signal interface.

6. The service switching system of claim 2, wherein the at least one service processor, the at least one electrical switch, and the at least one interface are integrated into one board.

7. The service switching system of claim 4, wherein the at least one interface comprises:
a first electrical signal interface;
an adaptation processor;
an optical-electrical conversion interface; and
a second bandwidth control interface,
the adaptation processor being configured to either:
receive the service data electrical signal from the at least one electrical switch using the first electrical signal interface, perform adaptation processing according to the adaptation control information from the bandwidth controller received from the second bandwidth control interface, and send the adaptation-processed service data electrical signal to the optical-electrical conversion interface; or
receive a service data electrical signal from the optical-electrical conversion interface, perform adaptation processing according to the adaptation control information from the bandwidth controller received from the second bandwidth control interface, and send the adaptation-processed service data electrical signal to the at least one electrical switch using the first electrical signal interface, and
the optical-electrical conversion interface being configured to either:
convert the service data electrical signal received from the adaptation processor into an optical signal and send the optical signal to the optical cross-connector in the optical cross-connect subrack; or
convert the service data optical signal received from the optical cross-connector into an electrical signal and send the electrical signal to the adaptation processor.

8. The service switching system of claim 4, wherein the optical cross-connector further comprises:
four optical fiber interfaces;
a dynamic optical cross-connector; and
a first bandwidth control interface,
the dynamic optical cross-connector being configured to:
receive, using any optical fiber interface, the service data optical signal from one of the service processing subracks;
perform optical cross-connection according to optical cross-connect control information from the bandwidth controller received using the first bandwidth control interface; and
output the cross-connected optical signal to the one of the service processing subracks using any optical fiber interface.

9. The service switching system of claim 7, wherein the adaptation control information from the bandwidth controller comprises delay information and sending control information, and the adaptation processor being further configured to:
perform receiving processing on the service data electrical signal received from the first electrical signal interface to recover the service data;
obtain first link status information from the recovered service data;
perform sorting and alignment processing on the recovered service data;
cache the recovered service data;
send the cached service data to the optical-electrical conversion interface according to the sending control information from the bandwidth controller and second link status information;
perform receiving processing on the service data electrical signal received from the optical-electrical conversion interface to recover the service data;
obtain second link status information from the recovered service data;
cache the recovered service data;
read the cached service data according to the delay information from the bandwidth controller; and
send the read service data to the first electrical signal interface according to first link status information.

10. The service switching system of claim 7, wherein the optical cross-connector further comprises:
four optical fiber interfaces; and
a static optical cross-connector, the static optical cross-connector being configured to:
receive, using any optical fiber interface, the service data optical signal from one of the service processing subracks;
perform optical cross-connection according to a fixed connection relationship between an optical input port and an optical output port of the static optical cross-connector; and
output the cross-connected optical signal to the one of the service processing subracks using any optical fiber interface, and
the optical-electrical conversion interface being configured to:
receive optical signal wavelength adjustment information from the bandwidth controller using the first bandwidth control interface;
determine a wavelength for sending an optical signal according to the optical signal wavelength adjustment information; and
either convert the service data electrical signal received from the adaptation processor into an optical signal according to the determined optical signal wavelength and send the optical signal to the static cross-connector in the optical cross-connector; or
convert the service data optical signal received from the static optical cross-connector in the optical cross-connector into an electrical signal and send the electrical signal to the adaptation processor.

11. The service switching system of claim 8, wherein the at least one service processor is further configured to send obtained traffic information to the bandwidth controller during dynamic service processing, and during dynamic service processing, the bandwidth controller is further configured to:
obtain service configuration information;
receive the traffic information;
generate switching control information, the adaptation control information, and optical cross-connect control information according to an optical connection bandwidth required between each of the at least one interface and each optical cross-connector; and
send the switching control information, the adaptation control information, and the optical cross-connect control information to the at least one electrical switch, the at least one interface, and the optical cross-connector, respectively, or
during static service processing, the bandwidth controller is further configured to:
obtain service configuration information;
determine, according to the service configuration information, an optical connection bandwidth required between each of the at least one interface and each optical cross-connector;
generate switching control information, the adaptation control information, and optical cross-connect control information according to the determined optical connection bandwidth required between each of the at least one interface and each optical cross-connector; and send the switching control information, the adaptation control information, and the optical cross-connect control information to the at least one electrical switch, the at least one interface, and the optical cross-connector, respectively.

12. The service switching system of claim 10, wherein the at least one service processor is further configured to send obtained traffic information to the bandwidth controller during dynamic service processing, and during dynamic service processing, the bandwidth controller is further configured to:

obtain service configuration information;

receive the traffic information;

generate switching control information, the adaptation control information, and the optical signal wavelength adjustment information according to an optical connection bandwidth required between each of the at least one interface and each optical cross-connector;

send the switching control information to the at least one electrical switch; and send the adaptation control information and the optical signal wavelength adjustment information to the at least one interface, or during static service processing, the bandwidth controller is further configured to:

obtain service configuration information;

determine, according to the service configuration information, an optical connection bandwidth required between each of the at least one interface and each optical cross-connector;

generate switching control information, the adaptation control information, and the optical signal wavelength adjustment information according to the determined optical connection bandwidth required between each of the at least one interface and each optical cross-connector;

send the switching control information to the at least one electrical switch; and send the adaptation control information and the optical signal wavelength adjustment information to the at least one interface.

13. A service switching method, applied to a service switching system, the service switching system comprising a bandwidth controller, at least one optical cross-connect subrack coupled to the bandwidth controller, at least two service processing subracks coupled to the bandwidth controller and being coupled to the optical cross-connect subrack using an optical fiber, and each service subrack comprising at least one interface, and the method comprising:

performing, by one of the service processing subracks, service switching for an externally inputted service data electrical signal;

converting the service-switched service data electrical signal into an optical signal;

sending the optical signal to the optical cross-connect subrack;

receiving, by the optical cross-connect subrack, a service data optical signal from the one of the service processing subracks;

performing optical cross-connection for the received optical signal;

outputting the cross-connected optical signal to the one of the service processing subracks;

receiving, by the one of the service processing subracks, a service data optical signal from the optical cross-connect subrack;

converting the optical signal into an electrical signal;

performing service switching;

outputting the service-switched service data electrical signal; and performing bandwidth control for the service processing subracks by sending adaptation control information and optical signal wavelength adjustment information to the interfaces of the service processing subracks when the service processing subracks perform service switching for different services.

14. The service switching of claim 13, wherein each service processing subrack comprises at least one service processor, at least one electrical switch, and the at least one interface, and when performing service switching for the externally inputted service data electrical signal, converting the service-switched service data electrical signal into the optical signal, and sending the optical signal to the optical cross-connect subrack, the method further comprises:

receiving, by the at least one service processor, the service data electrical signal inputted externally;

performing service processing;

sending the service-processed service data electrical signal to the at least one electrical switch;

receiving, by the at least one electrical switch, the service data electrical signal from the at least one service processor;

performing service switching according to switching control information from the bandwidth controller;

sending the service-switched service data electrical signal to the at least one interface;

receiving, by the at least one interface, the service data electrical signal from the at least one electrical switch;

converting service data from the electrical signal into an optical signal according to the adaptation control information from the bandwidth controller; and sending the optical signal to the optical cross-connect subrack, and when receiving the service data optical signal from the optical cross-connect subrack, converting the optical signal into the electrical signal, performing service switching, and outputting the service-switched service data electrical signal, the method further comprises:

receiving, by the at least one interface, the service data optical signal from the optical cross-connect subrack;

converting service data from the optical signal into an electrical signal according to the adaptation control information from the bandwidth controller;

sending the electrical signal to the at least one electrical switch;

receiving, by the at least one electrical switch, the service data electrical signal from the at least one interface;

performing service switching according to the switching control information from the bandwidth controller;

sending the service-switched service data electrical signal to the at least one service processor;

receiving and processing, by the at least one service processor, the service-switched service data electrical signal from the at least one electrical switch; and outputting the processed service data electrical signal.

15. The service switching method of claim 14, wherein the optical cross-connect subrack comprises at least one optical cross-connector, and when receiving the service data optical signal from one of the service processing subracks, performing optical cross-connection for the received optical signal and outputting the cross-connected optical signal to the one of the service processing subracks, the method further comprises:
    receiving, by the optical cross-connector, the service data optical signal from the one of the service processing subracks;
    performing optical cross-connection for the received optical signal; and
    outputting the cross-connected optical signal to the one of the service processing subracks.

16. The service switching method of claim 15, wherein when receiving the service data electrical signal from the at least one electrical switch, converting service data from the electrical signal into the optical signal according to the adaptation control information from the bandwidth controller and sending the optical signal to the optical cross-connect subrack, the method further comprises:
    receiving, by the at least one interface, the service data electrical signal from the at least one electrical switch;
    performing receiving processing to recover the service data;
    obtaining first link status information from the recovered service data;
    performing sorting and alignment processing on the recovered service data;
    caching the recovered service data;
    converting the cached service data into a service data optical signal; and
    sending, according to sending control information from the bandwidth controller and second link status information, the optical signal to the optical cross-connector in the optical cross-connect subrack, and
    when receiving the service data optical signal from the optical cross-connect subrack, converting the service data from the optical signal into the electrical signal according to the adaptation control information from the bandwidth controller and sending the electrical signal to the at least one electrical switch, the method further comprises:
    receiving, by the at least one interface, the service data optical signal from at optical cross-connect unit in the optical cross-connect subrack;
    converting the optical signal into an electrical signal;
    performing receiving processing to recover the service data;
    obtaining second link status information from the recovered service data;
    caching the recovered service data;
    reading the cached service data according to delay information from the bandwidth controller; and
    sending the read service data to the at least one electrical switch according to the first link status information.

17. The service switching method of claim 15, further comprising sending, by the at least one service processor, the obtained traffic information to the bandwidth controller during dynamic service processing, and when the optical cross-connector further comprises a dynamic optical cross-connector, during dynamic service processing, the method further comprises:
    generating switching control information, the adaptation control information, and optical cross-connect control information according to an optical connection bandwidth required between each of the at least one interface and each optical cross-connector; and
    sending the switching control information, the adaptation control information, and the optical cross-connect control information to the at least one electrical switch, the at least one interface, and the dynamic optical cross-connector in the optical cross-connect unit, respectively, or
    during static service processing, the method further comprises:
        obtaining service configuration information;
        generating switching control information, the adaptation control information, and optical cross-connect control information according to an optical connection bandwidth required between each of the at least one interface and each optical cross-connector; and
        sending the switching control information, the adaptation control information, and the optical cross-connect control information to the at least one electrical switch, the at least one interface, and the optical cross-connector, respectively.

18. The service switching method of claim 15, further comprising sending, by the at least one service processor, the obtained traffic information to the bandwidth controller during dynamic service processing, and when the optical cross-connector further comprises a static optical cross-connector, during dynamic service processing, the method further comprises:
    generating switching control information, the adaptation control information, and the optical signal wavelength adjustment information according to an optical connection bandwidth required between each of the at least one interface and each optical cross-connector;
    sending the switching control information to the at least one electrical switch; and
    sending the adaptation control information and the optical signal wavelength adjustment information to the at least one interface, or
    during static service processing, the method further comprises:
        obtaining service configuration information;
        generating switching control information, the adaptation control information, and the optical signal wavelength adjustment information according to an optical connection bandwidth required between each at least one interface and each optical cross-connector;
        sending the switching control information to the at least one electrical switch; and
        sending the adaptation control information and the optical signal wavelength adjustment information to the at least one interface.

\* \* \* \* \*

UNITED STATES PATENT AND TRADEMARK OFFICE
CERTIFICATE OF CORRECTION

PATENT NO. : 10,200,771 B2
APPLICATION NO. : 15/668481
DATED : February 5, 2019
INVENTOR(S) : Buyun Wang, Xinhua Xiao and Tianhai Chang It is certified that error appears in the above-identified patent and that said Letters Patent is hereby corrected as shown below:

On the Title Page

Page (2), Item (30), Line 1: "201510057069" should read "201510057069.2"

In the Claims

Column 35, Line 44 Claim 16: "at optical" should read "an optical"

Signed and Sealed this
Nineteenth Day of March, 2019

Andrei Iancu
*Director of the United States Patent and Trademark Office*